US 11,500,916 B2

United States Patent
Adams et al.

(10) Patent No.: US 11,500,916 B2
(45) Date of Patent: Nov. 15, 2022

(54) IDENTIFYING MEDIA COMPONENTS

(71) Applicant: Friend for Media Limited, Birmingham (GB)

(72) Inventors: Richard William Adams, Birmingham (GB); Laurence Kit Gladden, Birmingham (GB); William Del Strother, Birmingham (GB); Jonathan Norman Friend, Birmingham (GB); George Douglas Demetriades, Birmingham (GB); Chris Troop, Birmingham (GB)

(73) Assignee: Friend for Media Limited

( * ) Notice: Subject to any disclaimer, the term of this patent is extended or adjusted under 35 U.S.C. 154(b) by 113 days.

(21) Appl. No.: 16/842,116

(22) Filed: Apr. 7, 2020

(65) Prior Publication Data

US 2020/0311121 A1 Oct. 1, 2020

Related U.S. Application Data

(63) Continuation of application No. 15/034,884, filed as application No. PCT/GB2014/053329 on Nov. 7, 2014, now Pat. No. 10,977,298.

(30) Foreign Application Priority Data

Nov. 8, 2013 (GB) ..................... 1319783
Jan. 23, 2014 (GB) ..................... 1401130
Jun. 5, 2014 (GB) ..................... 1410032

(51) Int. Cl.
*G06F 16/48* (2019.01)
*G06F 16/951* (2019.01)
*G06F 21/16* (2013.01)

(52) U.S. Cl.
CPC ............ *G06F 16/48* (2019.01); *G06F 16/951* (2019.01); *G06F 21/16* (2013.01)

(58) Field of Classification Search
CPC ........ G06F 16/48; G06F 16/951; G06F 21/16; G06F 9/445
See application file for complete search history.

(56) References Cited

U.S. PATENT DOCUMENTS 8,094,872 B1 1/2012 Yagnik et al.
8,412,841 B1 4/2013 Swaminathan et al.
(Continued)

FOREIGN PATENT DOCUMENTS

CA 2276638 6/2000
CA 2760414 6/2013
(Continued)

OTHER PUBLICATIONS

European Examination Report dated Jan. 26, 2018 for European Appln No. 14 806 347.2; 5 pages.
(Continued)

*Primary Examiner* — Richard L Bowen
(74) *Attorney, Agent, or Firm* — Boyle Fredrickson S.C.

(57) ABSTRACT

A computer system arranged to determine whether a candidate media-component matches one or more reference media-components is provided. The computer system includes at least one processing device arranged to receive the candidate media-component. The at least one processing device may also include a window generator arranged to select a portion of the candidate media-component; a fingerprint generator arranged to generate a fingerprint from the portion of the candidate media-component selected by the window generator; and a comparator arranged to compare at least some of a candidate's fingerprints within the sequence of candidate fingerprints against fingerprints (Continued)

within the sequences of reference fingerprints. The comparator may assess at least one characteristic of the comparison between the fingerprints within the sequence. The system may determine that the candidate media-component matches a reference media-component should the at least one processing device determine that the candidate sequence of fingerprints matches a sequence of reference fingerprints.

16 Claims, 15 Drawing Sheets

(56) References Cited

U.S. PATENT DOCUMENTS

| | | | |
|---|---|---|---|
| 10,078,743 B1* | 9/2018 | Baldi | G06N 20/00 |
| 2003/0105739 A1 | 6/2003 | Essafi et al. | |
| 2006/0013451 A1* | 1/2006 | Haitsma | G06F 16/41 |
| | | | 382/124 |
| 2006/0187358 A1 | 8/2006 | Lienhart et al. | |
| 2008/0163288 A1 | 7/2008 | Ghosal et al. | |
| 2009/0012638 A1* | 1/2009 | Lou | G11B 27/28 |
| | | | 700/94 |
| 2009/0094253 A1 | 4/2009 | Hanai | |
| 2010/0049711 A1 | 2/2010 | Singh et al. | |
| 2010/0064372 A1 | 3/2010 | More et al. | |
| 2010/0131847 A1 | 5/2010 | Sievert et al. | |
| 2010/0211794 A1* | 8/2010 | Bilobrov | G06K 9/00067 |
| | | | 713/176 |
| 2010/0318515 A1 | 12/2010 | Zeitera | |
| 2011/0083142 A1 | 4/2011 | Kitazato | |
| 2011/0099584 A1 | 4/2011 | Rodriguez | |
| 2011/0138465 A1 | 6/2011 | Franklin et al. | |
| 2011/0289099 A1 | 11/2011 | Quan | |
| 2011/0299721 A1 | 12/2011 | Junfeng. et al. | |
| 2012/0143915 A1 | 6/2012 | Gupta et al. | |
| 2013/0177252 A1 | 7/2013 | Hafeeda et al. | |
| 2013/0297751 A1 | 11/2013 | Parker et al. | |
| 2014/0053233 A1 | 2/2014 | Jacobs | |
| 2014/0193027 A1 | 7/2014 | Scherf et al. | |
| 2015/0125058 A1 | 4/2015 | Zarrella | |

FOREIGN PATENT DOCUMENTS

| | | |
|---|---|---|
| EP | 1041823 | 3/2000 |
| EP | 2437498 | 4/2012 |
| GB | 2507551 | 7/2014 |
| JP | 2013/258758 | 4/2011 |
| WO | 2007148290 | 12/2007 |
| WO | 2008117245 | 10/2008 |
| WO | 2009018171 | 2/2009 |
| WO | 2009026564 | 2/2009 |
| WO | 2009026564 A1 | 12/2009 |
| WO | 2012089251 | 7/2012 |

OTHER PUBLICATIONS

European Examination Report dated Aug. 20, 2019 for European Appln No. 14 806 347.2.
Coskun et al.; Spatio-Temporal Transform Based Video Hashing, IEEE Transactions on Multimedia, vol. 8, No. 6 (Dec. 2006).
Piva et al., DCT-based Watermark Recovering without Resorting to the Uncorrupted Original Image, Universita di Firenze, Italy.
Potdar et al., A Survey of Digital Image Watermarking Techniques, School of Information Sys, Curtin Univ of Tech, Australia, 3rd Intl Conf. on Industrial Informatics (INDIC 2005).
Lian S et al.; "Content-Based Video Copy Detection—A Survey" Jan. 1, 2010; Intelligent Multimedia Analysis for Security Applications; (Studies in Computational Intelligence; 282), Spring, Berlin; Heidelberg, pp. 253-273.
GB1319783.5, Search Report dated Apr. 22, 2014, 5 pages.
GB1319783.5, Search Report dated Jul. 17, 2014, 2 pages.
GB1401130.8, Search Report dated Sep. 16, 2014, 3 pages.
GB1401130.8, Search Report dated Jul. 15, 2014, 6 pages.
GB1410032.5, Search Report dated Sep. 15, 2014, 4 pages.
Wu et al., "Streaming Video over the Internet: Approaches and Directions", IEE Transactions on Circuits and Systems For Video Technology, vol. 11, No. 3, Mar. 2001.
Reddit, How a company can 'catch' you for pirating: explainlikeimfive, http://www.reddit.com/r/explainlikeimfive/comments/15u5sl/eli5_how_a_company_c . . . , Sep. 25, 2014.
European Patent Office Communication dated Feb. 27, 2020; Application No. 14806347.2—(3) pages.
Examination Report for Application No. GB1606983.3 dated Mar. 18, 2021, 2 pages.
Office Action for Application No. GB 1606983.3 dated Jun. 30, 2020, 2 pages.
European Search Report for Application No. 21160532.4 dated Oct. 27, 2021, 8 pages.

* cited by examiner

IDENTIFYING MEDIA COMPONENTS

This application claims priority to U.S. patent application Ser. No. 15/034,884, filed on May 6, 2016, to PCT/GB2014/053329, filed on Nov. 7, 2014, to GB1410032.5, filed on Jun. 5, 2014, to GB1401130.8, filed on Jan. 23, 2014, and to GB1319783.5, filed on Nov. 8, 2013, the contents of each of which are hereby incorporated by reference.

Inventions herein relate to the identification of media components and related systems.

In some embodiments the invention relates to the derivation of a set of fingerprints from a media-component. In particular, but not exclusively, the fingerprints may be generated for media data. Yet further, but again not exclusively, the fingerprints might be generated for video data which might be streamed data. Embodiments may use the fingerprints to identify media data within a store, or library, of media data.

In some embodiments, this invention relates to systems and methods for the identification of data held within media-components. Embodiments of the invention may therefore, allow media data to be identified.

In some embodiments, this invention relates to systems and methods for the identification of users and/or devices to which media content was sent. Some embodiments relate to extracting watermarks from media content. In particular, but not exclusively, embodiments relate to processing video, which might be streamed video.

The advent of computer networks, such as the Internet, has meant that computing devices are becoming massively interconnected facilitating the copying and redistribution of data on an unprecedented scale. Data is very valuable and techniques are known to try and protect data. Such techniques include the watermarking of data so that the data has a specific signature and also the fingerprinting of data in order to detect characteristics of data without actually imposing a characteristic onto the data.

One such fingerprinting generating technique is described in the paper "Spatio-temporal transform based video hashing" by Baris Coskun, Bulent Sankur, Nasir Memon published in IEEE transactions on multimedia Vol. 8, no. 6, December 2006. However, there are shortcomings in the teachings of this paper in providing a useable technique.

As the bandwidth available on such networks has increased, the nature of the data held and viewed on those networks has changed from text based information to the present day where it is now common to have video based data. Nonetheless, whatever the type of data there is an ongoing desire to identify illicit copies of the data, generate usage data for the data, provide mechanisms to deliver content to users and the like. Given the massive amounts of data available on networks such as the Internet and WWW, the monitoring of the usage of the data on those networks has become difficult, and is now virtually impossible to perform manually.

It can be a problem to identify the source from which data originates as WWW pages are now being written that draw content from un-related and/or remote network location. Thus, for example, a WWW page may pull video data into a frame present on that page. As such, the Uniform Resource Locator (URL) of the WWW page may well not identify the ultimate source of the video (or other) data. It can be a significant problem to identify that ultimate source.

Moreover, as networks are used as the delivery mechanism for media content of events such as sporting events, movies, and the like, a significant amount of content, often video content, can be delivered. As such, it is a problem to find techniques that are fast enough to process the significant amounts of information.

According to a first aspect of the invention there is provided a computer system arranged to determine whether a candidate data-set matches a reference data-set.

Conveniently a processing device is provided which is arranged to receive the candidate data-set.

A window generator may be provided and arranged to select a portion of the data-set;

A fingerprint generator may be provided and arranged to generate a fingerprint from the portion the data-set selected by the window generator. Typically, the processing device is arranged to cause the window generator to move through the data-set and select a plurality of portions of the data-set from at least some of which the fingerprint generator is arranged to generate a candidate fingerprint thereby creating a sequence of candidate fingerprints;

A comparator may be provided and arranged to compare at least some of the candidate fingerprints within the sequence of candidate fingerprints against a store of reference fingerprints to determine if the store contains reference fingerprints which match at least one of the candidate fingerprints.

The processing device may be arranged to determine that the candidate sequence of fingerprints matches a reference set of fingerprints should the comparator determine that a minimum number of candidate fingerprints within the sequence of candidate fingerprints be held to match respective fingerprints with the sequence of reference fingerprints.

According to a second aspect of the invention there is provided a computer implemented method of determining whether a candidate data-set matches a reference data-set.

Typically, the method includes receiving the candidate data-set at a processing device and causing the processing device to move a window through the candidate data-set to a plurality of positions to select a portion of the data-set. The method may generate a candidate fingerprint from the portion of the data-set covered by the window for at least some of the positions of the window thereby creating a sequence of candidate fingerprints for the candidate data-set;

Typically a comparison is made of at least some of the candidate fingerprints within the sequence of candidate fingerprints against a store of reference fingerprints to determine if the store contains reference fingerprints which are held to match at least one of the candidate fingerprints;

The method may determine that the sequence of candidate fingerprints is held to be a match with a sequence of reference fingerprints should at least a minimum number of candidate fingerprints within the sequence of candidate fingerprints be held to match respective fingerprints within the sequence of reference fingerprints.

According to a third aspect of the invention there is provided a non-transitory computer-readable medium storing executable computer program code for determining whether a candidate data-set matches a reference data-set, the program code executable to perform steps comprising:

i) receiving the candidate data-set at a processing device and causing the processing device to move a window through the candidate data-set to a plurality of positions to select a portion of the data-set and to generate a candidate fingerprint from the portion of the data-set covered by the window for at least some of the positions of the window thereby creating a sequence of candidate fingerprints for the candidate data-set;

ii) comparing at least some of the candidate fingerprints within the sequence of candidate fingerprints against a store of reference fingerprints to determine if the store contains reference fingerprints which are held to match at least one of the candidate fingerprints; wherein iii) the sequence of candidate fingerprints is held to be a match with a sequence of reference fingerprints should at least a minimum number of candidate fingerprints within the sequence of candidate fingerprints be held to match respective fingerprints within the sequence of reference fingerprints.

According to a fourth aspect of the invention there is provided a computer implement method of deriving a sequence of fingerprints from one or more data-sets, the method will typically comprise at least some of the following:

a) receiving the or each data-set at a processing device and causing that processing device to:

i) move a window through the or each data-set to a plurality of positions and to select a portion of the or each data-set. The processing device may be arranged to process the portion of the or each data-set to generate a fingerprint indicative of the portion of the or each data-set. The processing device may further be arranged to store the fingerprint. Further the processing device may be arranged to process the portion of the, or each, data set to generate a quality measure indicative of the uniqueness of the fingerprint. Further, the processing device may be arranged to store the quality measure in association with the first fingerprint.

Fifth and sixth aspects of the invention may respectively provide a computer system arranged to provide the method of the fourth aspect of the invention and a machine readable medium containing instructions to cause a computer to provide the method of the fourth aspect of the invention.

Accordingly to a seventh aspect of the invention there is provided a computer implemented method of determining whether a candidate data-set matches a reference data-set, the method typically comprises at least some of the following steps;

i) receiving the candidate data-set at a processing device and causing the processing device to move a window through the candidate data-set to a plurality of positions to select a portion of the data-set. The processing device may be arranged to generate a candidate fingerprint from the portion of the data-set covered by the window for at least some of the positions of the window thereby creating a sequence of candidate fingerprints for the candidate data-set;

ii) process the portion of the data-set covered by the window to generate a quality measure indicative of the uniqueness of the fingerprint. The processing device may be arranged to store the quality measure in association with the fingerprint; and iii) comparing at least some of the candidate fingerprints within the sequence of candidate fingerprints against a store of reference fingerprints to determine if the store contains reference fingerprints which are held to match at least one of the candidate fingerprints. The comparison may be arranged such that the candidate fingerprint is held to match the reference fingerprint if the quality measure is greater than a predetermined threshold.

According to eighth and ninth aspects of the invention there is respectively provided a machine readable medium containing instructions which when loaded onto a computer cause that computer to perform the method of the seventh aspect of the invention and a computer system arranged to perform the method of the seventh aspect of the invention.

According to a tenth aspect of the invention there is provided a computer implement method of deriving a set of fingerprints from a data-set, comprising at least some of the following step;

i) receiving the reference data-set at a processing device and causing the processing device to move what is typically a fixed length window through the data-set and:

a) select data covered by a first position of the window relative to the data-set, generate a first fingerprint from the first position and may be store the first fingerprint;

b) subsequently the processing device may be arranged to move the window, relative to the data-set, to a further position different from the first. At the further position the processing device may be arranged to generate a further fingerprint from the further position and may be store the further fingerprint; and c) may be repeat step b) to generate and store further fingerprints.

According to eleventh and twelfth aspects of the invention there is respectively provided a machine readable medium containing instructions which when loaded onto a computer cause that computer to perform the method of the eighth aspect of the invention and a computer system arranged to perform the method of the eighth aspect of the invention.

According to a thirteenth aspect of the invention there is provided a system arranged to determine whether a candidate data-set matches a reference-data set, the system comprises at least some of the following:

i) at least one reference fingerprint generator arranged to receive a reference data-set and generate one or more reference fingerprints therefrom;

ii) a store of reference fingerprints to which the or each reference fingerprint generated by the fingerprint generator is added across a connection therebetween; and iii) at least one candidate fingerprint generator, arranged to receive a candidate data-set and generate one or more candidate fingerprints therefrom; and wherein the system may be arranged such that candidate fingerprints generated by the candidate fingerprint generator are compared against reference fingerprints stored within the fingerprint store to determine whether a reference fingerprint held within the store is substantially the same as the candidate fingerprint in order to identify whether the candidate data-set that generated the candidate fingerprint is the same, or at least substantially the same, as a reference data-set.

Embodiments that provide such a system are believed advantageous as they provide what is potentially an automated method of identifying a candidate data set which is robust and can process candidate data-sets in real, or at least pseudo real, time. Further, the system may be made to scale readily in order to provide which should enable it to provide monitoring services on a wide scale.

According to a fourteenth aspect of the invention there is provide a method of identifying a candidate media file comprising at least some of the following steps:

generating one or more candidate fingerprints representative of the candidate media file;

comparing the one or more candidate fingerprints against a store of reference fingerprints wherein each of the reference fingerprints is representative of a reference media file;

using the comparison to make a determination as to whether the candidate media file is the same, or at least substantially the same, as a reference media file for which a fingerprint is held within the library; and if the comparison determines that the candidate media file is the same, or at least substantially the same, as the reference media file identifying the candidate media file as the reference media file.

According to a fifteenth aspect of the invention there is provided a non-transitory machine readable medium storing executable computer program code for identifying a candidate media file, the program code executable to perform steps comprising at least some of the following steps:

i) generating one or more candidate fingerprints representative of the candidate media file;

ii) comparing the one or more candidate fingerprints against a store of reference fingerprints wherein each of the reference fingerprints is representative of a reference media file;

iii) using the comparison to make a determination as to whether the candidate media file is the same, or at least substantially the same, as a reference media file for which a fingerprint is held within the library; and if the comparison determines that the candidate media file is the same, or at least substantially the same, as the reference media file identifying the candidate media file as the reference media file.

According to a sixteenth aspect of the invention there is provided a method of capturing streamed media content by accessing a media stream across a network connection, the method comprising at least some of the following steps:

identifying a media stream available on a network by accessing across a connection to that network;

causing a first processing mechanism to start the media stream, across the connection to the network, and to act as a media server to re-transmit the media stream;

receiving the re-transmitted stream at a second processing mechanism; and capturing at least one of the header information and the media from the re-transmitted stream.

Embodiments providing such a method are believed advantageous as it provides a method of obtaining meta-data and/or the underlying media from a media stream. The meta-data can be used to identify the ultimate source of the media stream which can be useful in order to take enforcement action against a party that is generating the media stream. It is also helpful to be able re-construct files containing the media transmitted in a stream in order to analyse that media. It will be appreciated that streamed media is often delivered in fragments and it can be a problem to obtain the underlying media for comparison.

According to a seventeenth aspect of the invention there is provided a computer system for capturing streamed media content by accessing a media stream across a network connection, comprising at least some of the following:

a computer processor for executing computer program code; and a non-transitory computer-readable medium storing executable program code for identifying a media stream across a network connection, the program code executable to perform steps comprising at least some of the following:

causing a first processing mechanism to start the media stream, across the network connection, and to act as a media server to re-transmit the media stream;

receiving the re-transmitted stream at a second processing mechanism; and capturing at least one of the header information and the media content from the re-transmitted stream.

According to a eighteenth aspect of the invention there is provided a non-transitory computer-readable medium storing executable computer program code for capturing streamed media content by accessing a media stream across a network connection, the program code executable to perform steps comprising at least some of the following steps:

identifying a media stream across a network connection;

causing a first processing mechanism to start the media stream, across the network connection, and to act as a media server to re-transmit the media stream;

receiving the re-transmitted stream at a second processing mechanism; and capturing at least one of the header information and the media content from the re-transmitted stream.

According to nineteenth aspect of the invention there is provided a method of identifying media content, comprising at least some of the following steps:

using a processing mechanism to:

i) collect meta-data from a network, the meta-data being associated with a candidate data-set;

ii) process the meta-data to obtain schedule data relating to the candidate data-set and using the schedule data to determine a schedule to capture the candidate data-set; and iii) capturing the candidate data-set according to the schedule determined from the schedule data.

Embodiments providing such a method are believed advantageous in that they facilitate the automatic monitoring of data-sets on a network. The automated collection of meta-data can be used to assist with processing of large volumes of data that would other wise not be possible.

According to an twentieth aspect of the invention there is provided a computer system for identifying media content, comprising at least some of the following:

a computer processor for executing computer program code; and a non-transitory computer medium storing executable program code for performing at least some of the following:

i) collecting meta-data from a network, the meta-data being associated with a candidate data-set;

ii) processing the meta-data to obtain schedule data relating to the candidate data-set and using the schedule data to determine a schedule to capture the candidate data-set; and iii) capturing the candidate data-set according to the schedule determined from the schedule data.

According to a twenty first aspect of the invention there is provided a method of delivering an improved version of a media file to a user after that user plays an initial version of the media file, the method comprising at least some of the following steps:

generating a reference fingerprint from a source version of the media file and storing that reference fingerprint in a store;

allowing a user to play the initial version of the media file;

identifying the initial version of the media file by a generating a candidate fingerprint and identifying that candidate fingerprint via a look-up against the store of reference fingerprints; and delivering, to the user, the improved version of the media file, when compared to the initial media file, that has been identified in the look-up against the store of reference fingerprints.

According to a twenty second aspect of the invention there is provided a computerised method of identifying a candidate media file comprising at least some of the following steps:

causing one or more processing devices to:
capture, from a network to which the processing device has access, the candidate media file and meta data associated with the candidate media file wherein the meta data at least specifies the network location from which the candidate media file originated;
determine whether the candidate media file is known: and
should the candidate media file be known, determine whether it is appropriate to send a communication to the network location specified within the meta data.

According to an twenty third aspect of the invention there is provided a system arranged to identify a candidate media file, the system comprising at least some of the following:
a media capture element, arranged to have access to a network, and further arranged to capture, from the network, the candidate media file and meta data associated with the candidate media file wherein the meta data at least specifies the network location from which the candidate media file originated;
an input mechanism arranged to allow a user to identify a candidate media file; and
an enforcement data store arranged to store meta data associated with candidate media files identified by a user.

According to a twenty fourth aspect of the invention there is provided a method of determining the identity of a user to which media content was delivered, the method comprising at least some of the following steps:

i) monitoring a network for media content having a fingerprint matching a reference fingerprint held within a store of reference fingerprints to generate candidate media content;
ii) processing the candidate media content to extract one or more watermarks encoded thereinto; and
iii) decoding the or each watermark to obtain an identity code identifying the user to which the media content was sent.

According to a twenty fifth aspect of the invention there is provided a method of securing media-content, the method comprising at least some of the following steps:
arranging a media-delivery platform to have a plurality of target devices connected thereto and further arranging the media-delivery platform to deliver the media-content to each of the target devices;
recording a reference fingerprint representing the media-content;
arranging the platform to generate a watermarked version of the media-content for each target device to which the media-content is delivered, which watermarked version is arranged to identify the target device to which the media-content was delivered;
monitoring a network to detect media content having a fingerprint which is the same, or at least substantially the same, as the reference fingerprint where each so detected media-content provides a candidate media-content to be decoded; and
extracting the watermark from within the or each candidate media-content to identify the target device to which the media-content was delivered.

Embodiments may be arranged such that extraction of the watermark includes temporal alignment of the candidate media content against a reference.

Conveniently, the fingerprint matching process employed is utilised to provide a coarse alignment of the candidate media content and the reference and such embodiments are believed advantageous because they facilitate extraction of the watermark whilst using part of the identification mechanism (ie matching of the fingerprints) to increase the robustness of that extraction.

At least some embodiments are arranged to extract features from the candidate media and used to provide fine alignment of the candidate media against the reference. Such embodiments increase the accuracy of the watermark extraction by more accurately identifying the start position of any embedded watermark.

At least some embodiments, are arranged to divide the media-content into a plurality of time bounded segments and to maintain at least first and second copies of each time bounded segment. Such embodiments are convenient as they allow the method to be used with adaptive streaming protocols. Typically, the watermarked version is generated by combining time bounded segments from the first and second copies of the time bounded segments.

Conveniently, some at least some embodiments apply a different watermark to a first copy of each time bounded segment compared to the second copy of that time bounded segment. Such embodiments conveniently apply an identity code to the media content via the time bounded segments.

The time bounded segments are of a predetermined length, which conveniently are substantially between 0.1 seconds and 15 seconds, or more preferably substantially in the range of 5 seconds and 10 seconds.

Some embodiments may be arranged such that the pre-determined lengths of watermark each provide a digit of the identity code which may provide a bit of a binary number.

The media-content may be streamed across a Wide Area Network (WAN). Conveniently the network uses the TCP/IP protocols. The network may be the Internet.

Some embodiments may be arranged to terminate delivery of the media content to the or each identified user and/or identified targeted device.

At least some embodiments may be arranged to process video content, as the media content wherein a watermark is applied to substantially each frame of the video content. Such embodiments are convenient as the watermark extraction process becomes more robust since there then becomes multiple chances to extract the correct watermark, there being a plurality of frames per time bounded segment. Some embodiments may be arranged to score, or otherwise statistically analyse, the watermarks extracted from each frame of a time bounded segment in order to determine the watermark encoded into that time bounded segment.

According to a twenty sixth aspect of the invention there is provided a system comprising a processor, wherein the processor is arranged to, in use, to provide the method of the first aspect of the invention.

According to a twenty seventh aspect of the invention there is provided a machine readable medium containing instructions which when read by a computer cause that computer to provide the method of the first aspect of the invention.

According to a twenty eighth aspect of the invention there is provided a system comprising a processor, wherein the processor is arranged to, in use, to provide the method of the second aspect of the invention.

According to a twenty ninth aspect of the invention there is provided a machine readable medium containing instructions which when read by a computer cause that machine to perform the method of the second aspect of the invention.

According to a thirtieth aspect of the invention there is provided a method of detecting a watermark within media content, the method comprising at least some of the following steps:
- using reference media content to generate delivered media content in which a watermark is embedded into at least one time bounded segment thereof;
- recording a fingerprint of the reference media content used to generate the delivered media content;
- identifying one or more pieces of candidate media content;
- processing the or each piece of candidate media content to determine whether they have the same, or at least substantially the same, fingerprint as the reference media content;
- using the determination of the fingerprint of the candidate media content to obtain timing information of the candidate media content to allow the or each time bounded segment within the candidate media content to be identified; and
- extracting a watermark from the or each time bounded segment.

According to an thirty first aspect of the invention there is provided a system comprising a processor, wherein the processor is arranged to, in use, to provide the method of the seventh aspect of the invention.

According to a thirty second aspect of the invention there is provided a machine readable medium containing instructions which when read by a computer cause that computer to perform the method of the seventh aspect of the invention.

According to a thirty third aspect of the invention there is provided a method of detecting a watermark within media content, the method comprising at least one of the following steps:
- using reference media content to generate delivered media content in which a watermark is embedded in at least one time bounded segment thereof;
- recording reference information for the reference media content used to generate the delivered media stream;
- identifying one or more pieces of candidate media content;
- processing the or each piece of candidate media content and extracting at least one feature from the candidate media content;
- comparing the extracted feature from the candidate media content with the reference information;
- using the comparison to make a determination of the start of the time bounded segment; and
- extracting a watermark from the or each time bounded segment.

According to a thirty fourth aspect of the invention there is provided a system comprising a processor, wherein the processor is arranged to, in use, to provide the method of the tenth aspect of the invention.

According to a thirty fifth aspect of the invention there is provided a machine readable medium containing instructions which when read by a computer cause that machine to perform the method of the tenth aspect of the invention.

The skilled person will appreciate that, in the above aspects, the term data-set is broader than and includes data such as media-components. Further, media-components may include streamed media, including an adaptive streaming protocol (such as HTTP Live Streaming (HLS); 3GPP adaptive HTTP streaming; Microsoft™ Smooth Streaming; Dynamic Adaptive Streaming Over HTTP (DASH)), video files such as MP4, AVI, Windows Media Video files, audio content such as streamed audio content, or discrete audio files (such as MP3 files).

The skilled person will appreciate that a feature of any one aspect of the invention may be applied, mutatis mutandis, to any other aspect of the invention.

Further the skilled person will appreciate that elements of the aspects may be provided in software. However, the skilled also appreciate that any software element may be provided in firmware and/or within hardware, or vice versa.

The machine readable medium referred to in any of the above aspects of the invention may be any of the following: a CDROM; a DVD ROM/RAM (including −R/−RW or +R/+RW); a hard drive; a memory (including a USB drive; an SD card; a compact flash card or the like); a transmitted signal (including an Internet download, ftp file transfer of the like); a wire; etc.

There now follows, by way of example only, a detailed description of embodiments of the invention with reference to the accompanying drawings of which:

FIG. 1 schematically shows a processing system arranged to perform an embodiment of the invention;

FIG. 2 schematically shows a system arranged to generate fingerprints;

Figure 2:
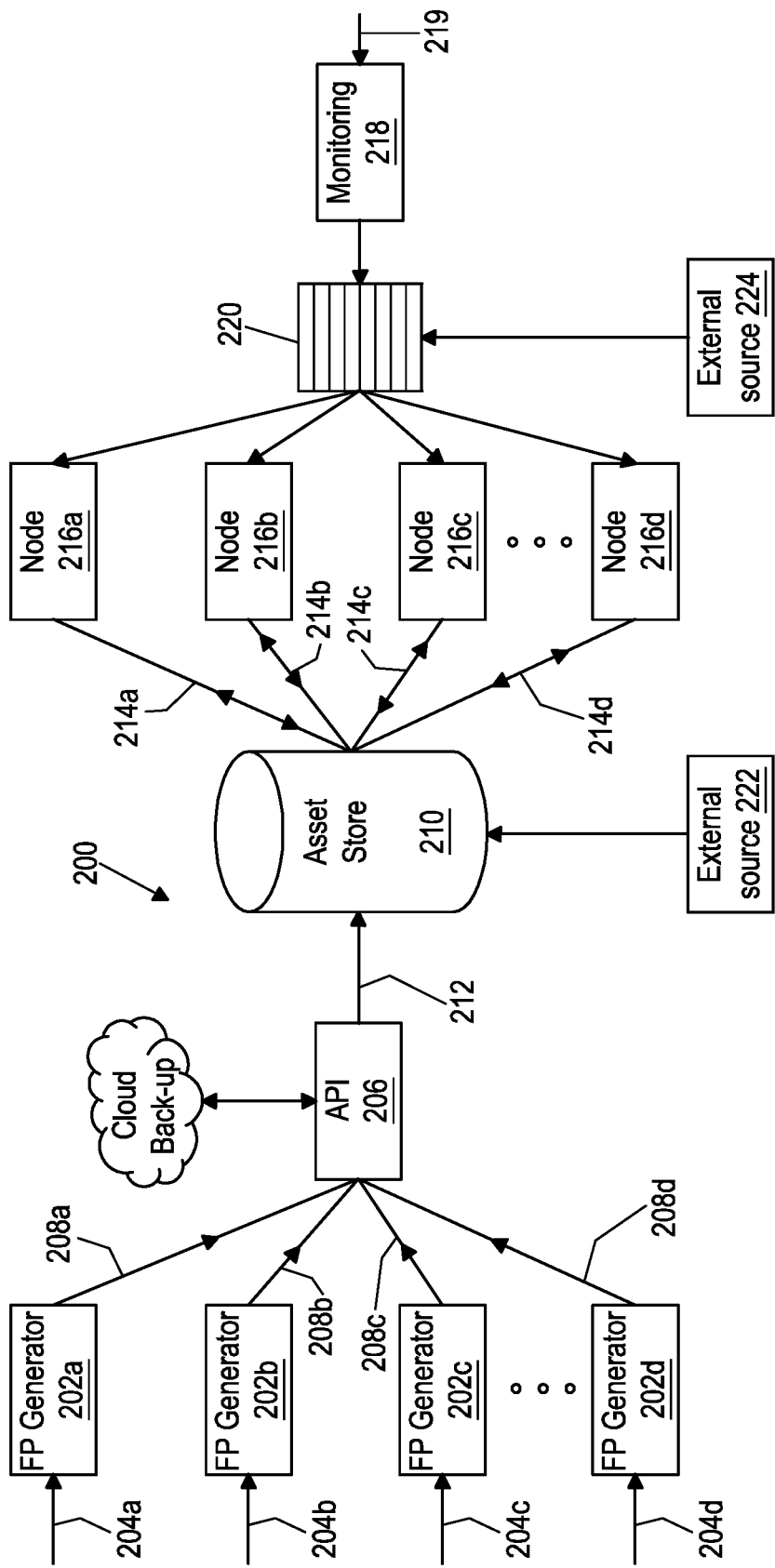
Figure 7:
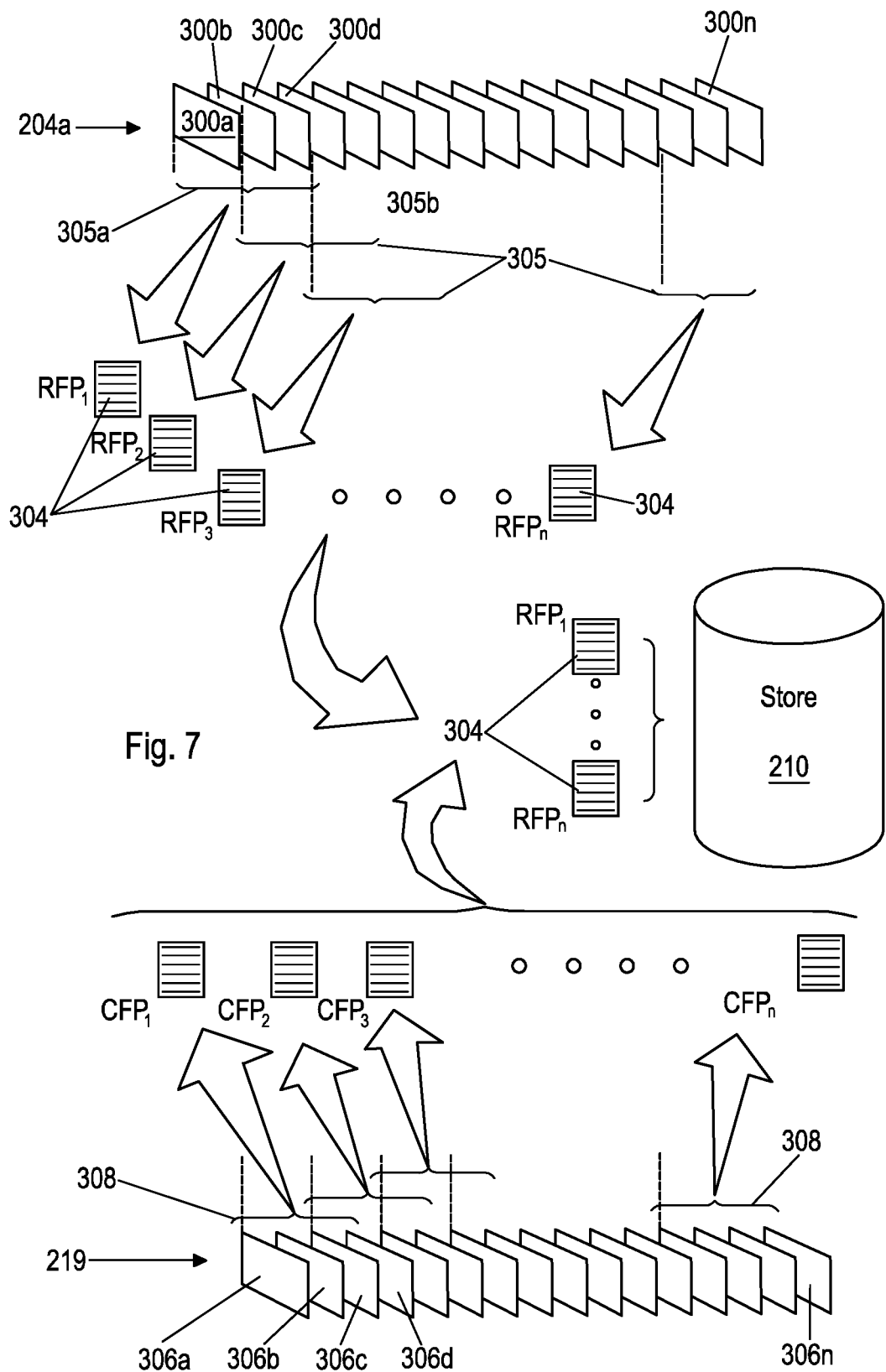
Figure 8:
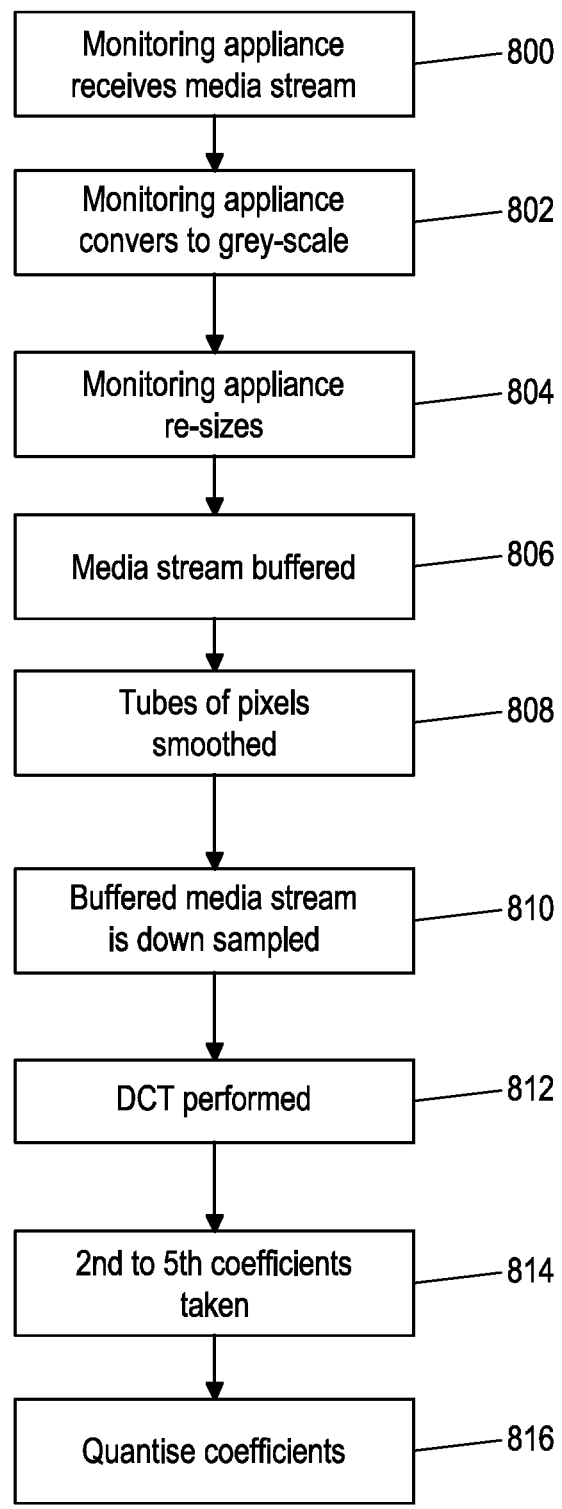
Figure 9:
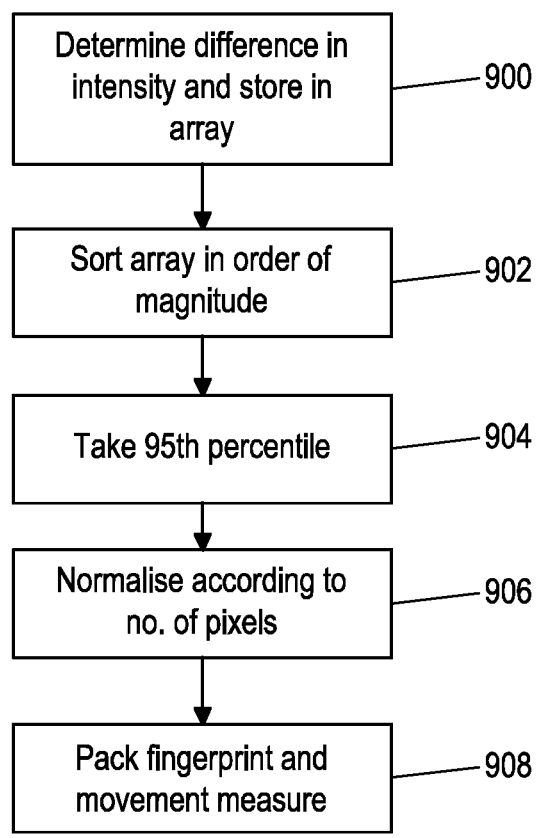
Figure 10:
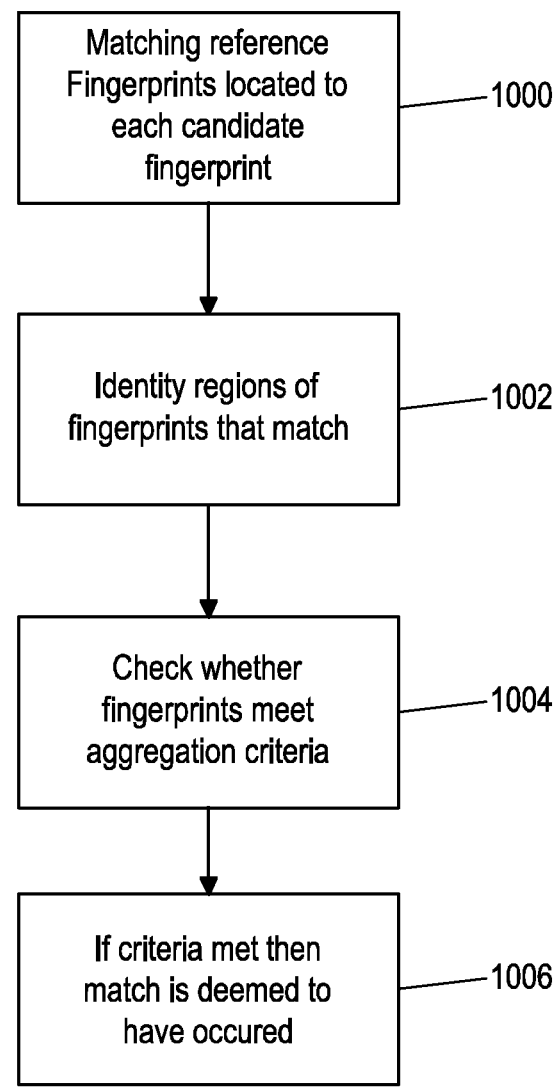
Figure 11A:
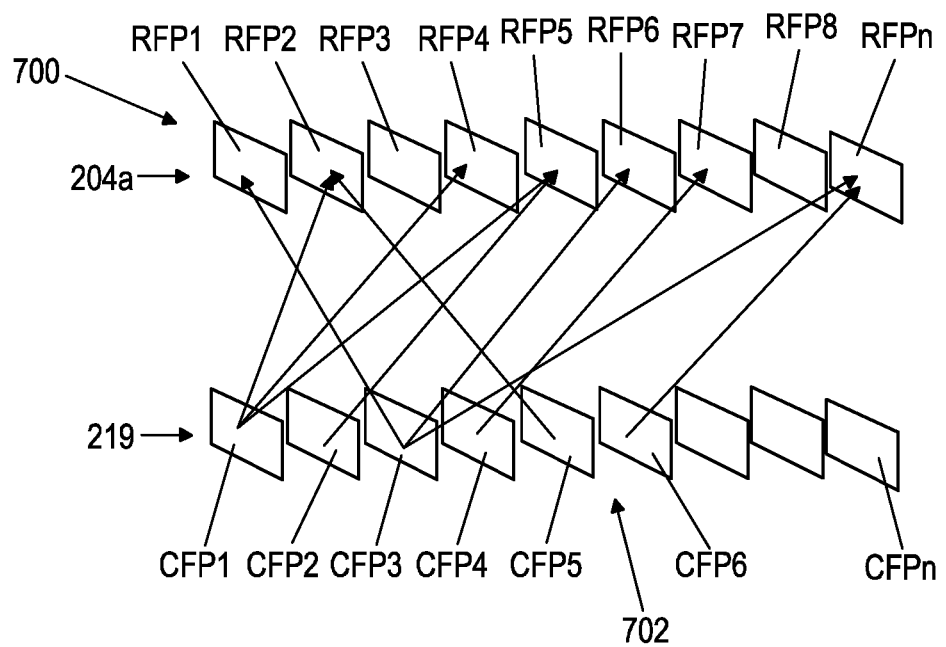
Figure 11B:
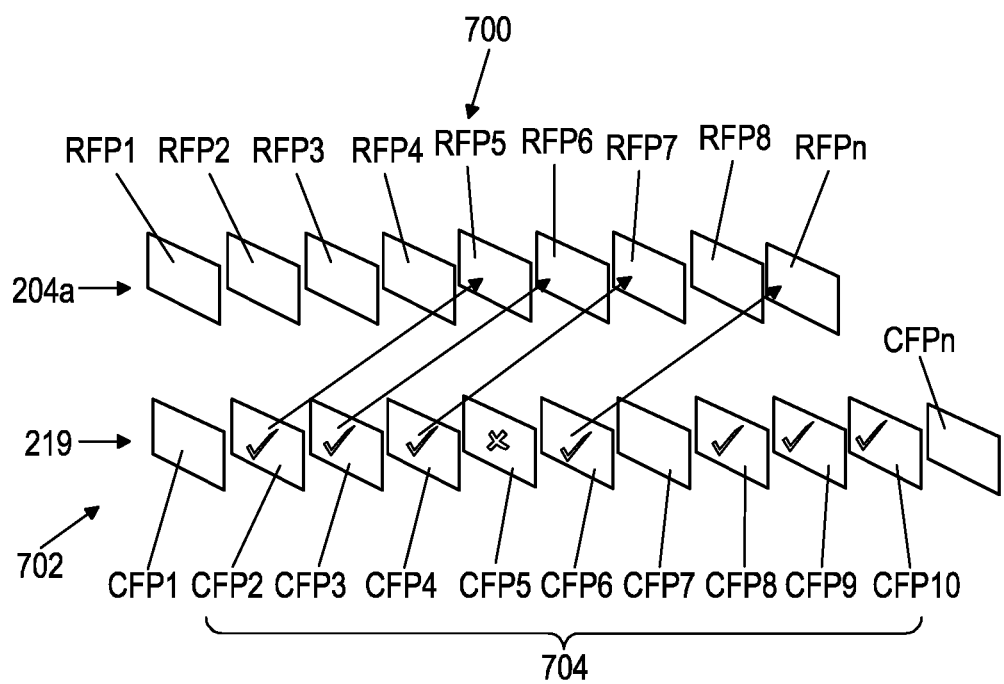
Figure 12:
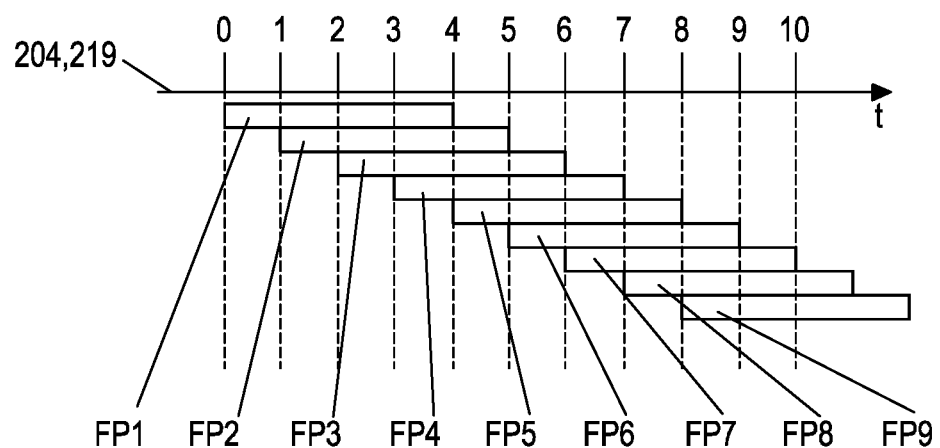
Figure 13:
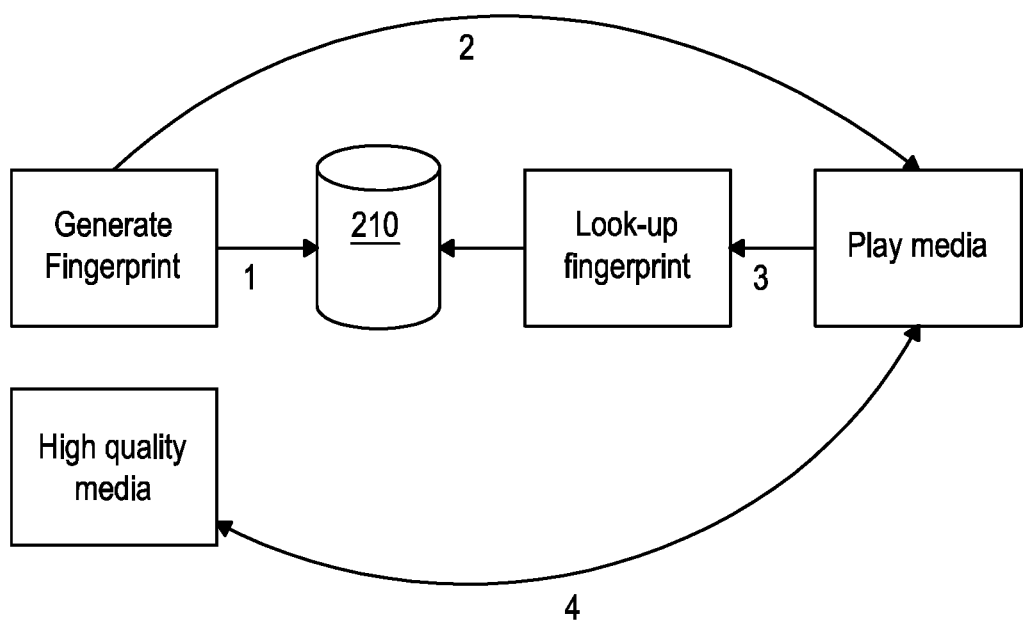
Figure 14:
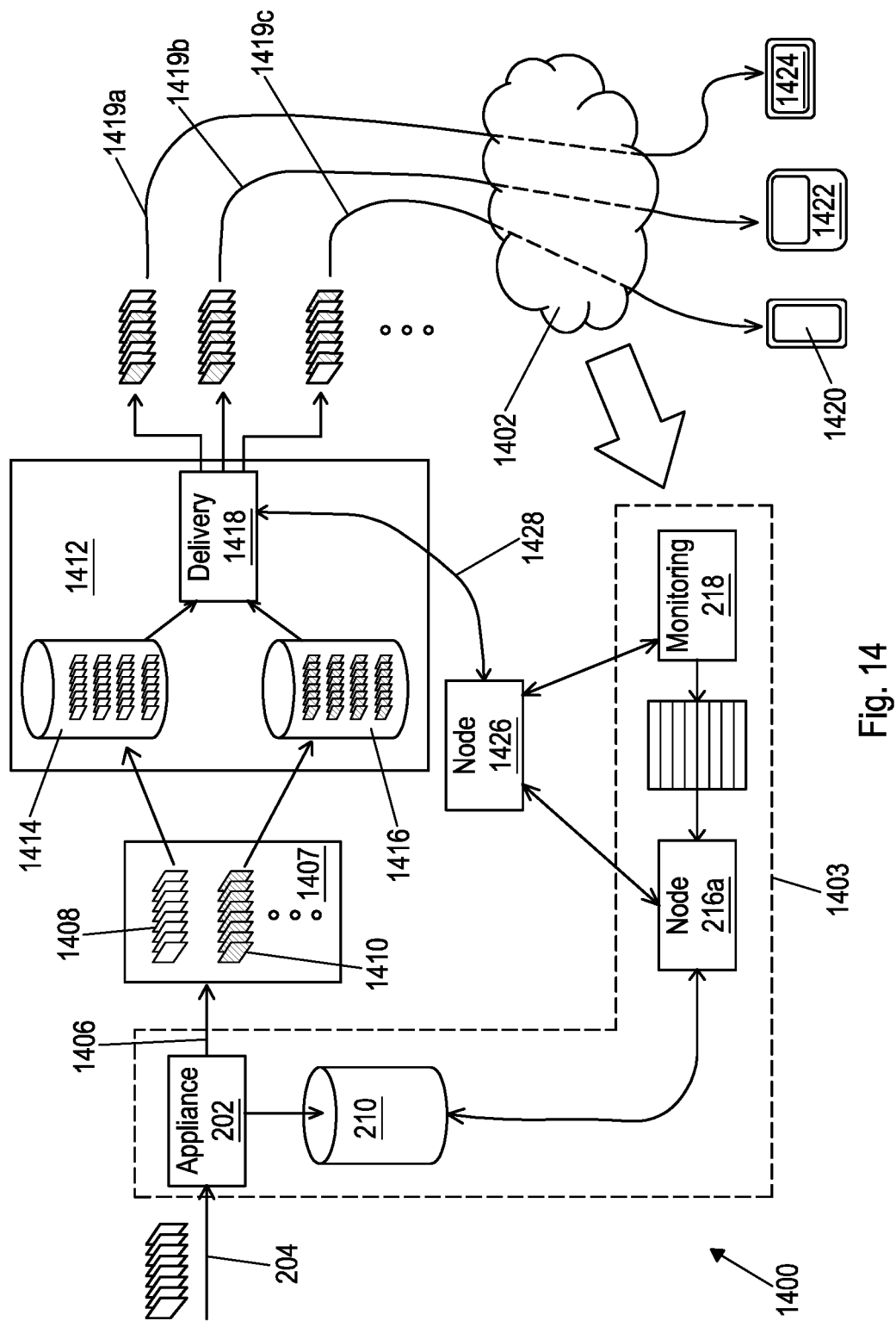
Figure 15A:
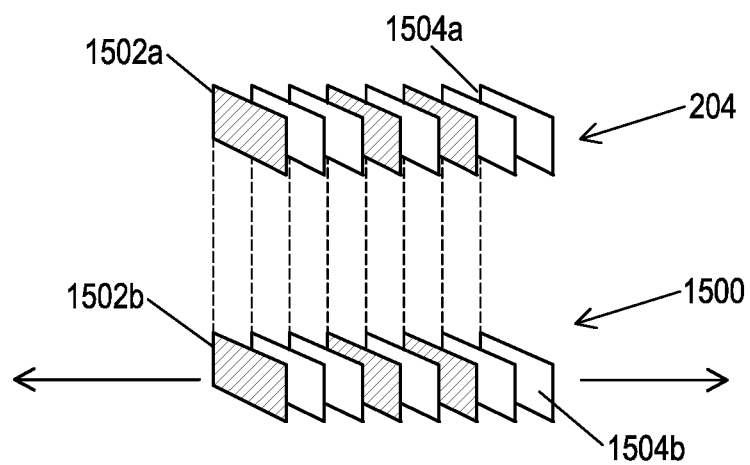
Figure 15B:
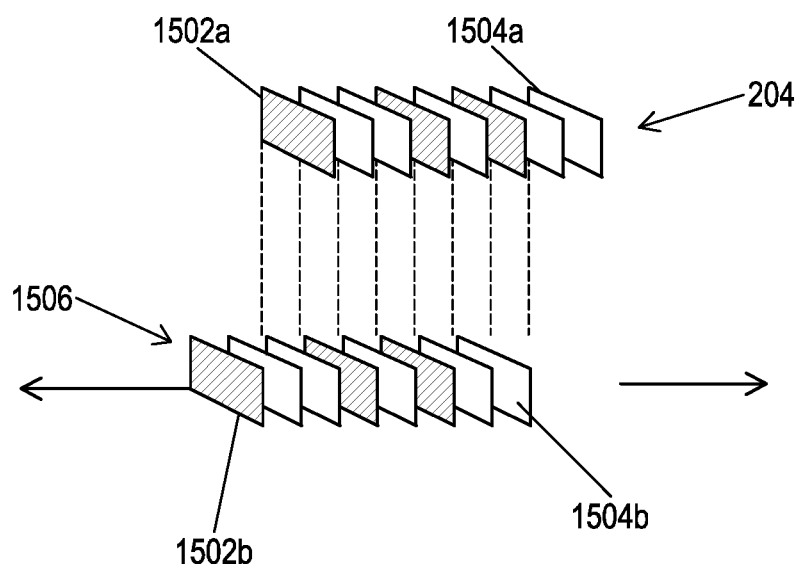

FIG. 7 schematically shows how fingerprints are generated;

FIG. 8 shows a flow chart outlining a fingerprint generation process;

FIG. 9 shows a flow chart outlining a process for generating a quality measure associated with a fingerprint;

FIG. 10 shows a flow chart outlining a process for determining whether a reference fingerprint matches a candidate fingerprint;

FIG. 11a exemplifies a process of determining whether a candidate fingerprint matches a reference fingerprint;

FIG. 11b exemplifies a series of matching fingerprints within a series of candidate fingerprints;

FIG. 12 exemplifies the overlapping nature of fingerprints created by the system;

FIG. 13 shows a diagram highlighting a process flow of a further embodiment of the system outlined in FIG. 2;

FIG. 14 schematically shows a system arranged to deliver media streams to users;

FIG. 15a exemplifies how two media streams are aligned with one another;

FIG. 15b exemplifies a media-stream which is not temporally aligned; and

Figure 16:
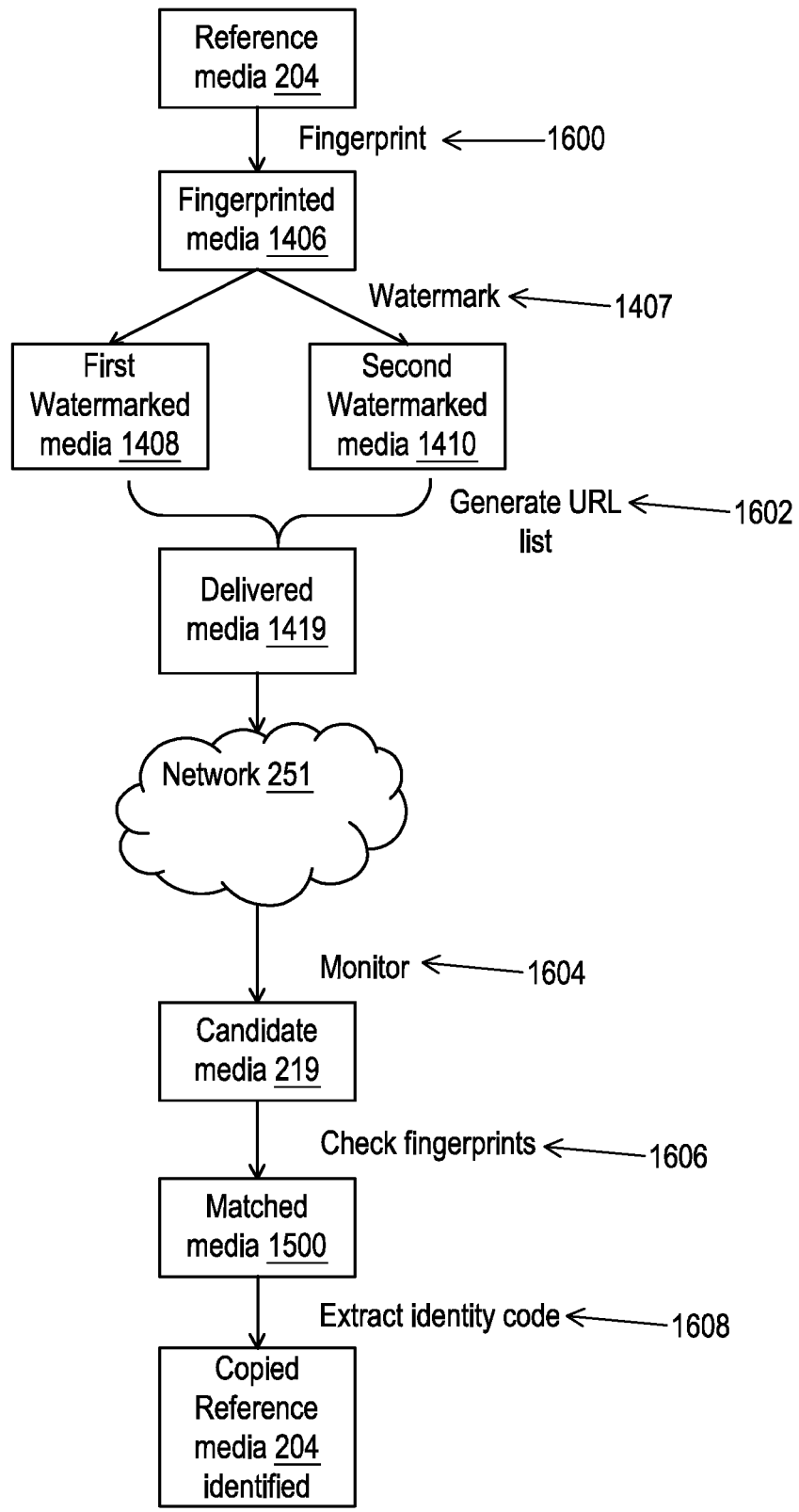

FIG. 16 shows a flow chart of the processing of media by embodiments.

The following description provides a description of various embodiments and the skilled person will readily appreciate that a feature described in relation to a given embodiment may be applied, mutatis mutandis, to any of the other embodiments.

Figure 1:
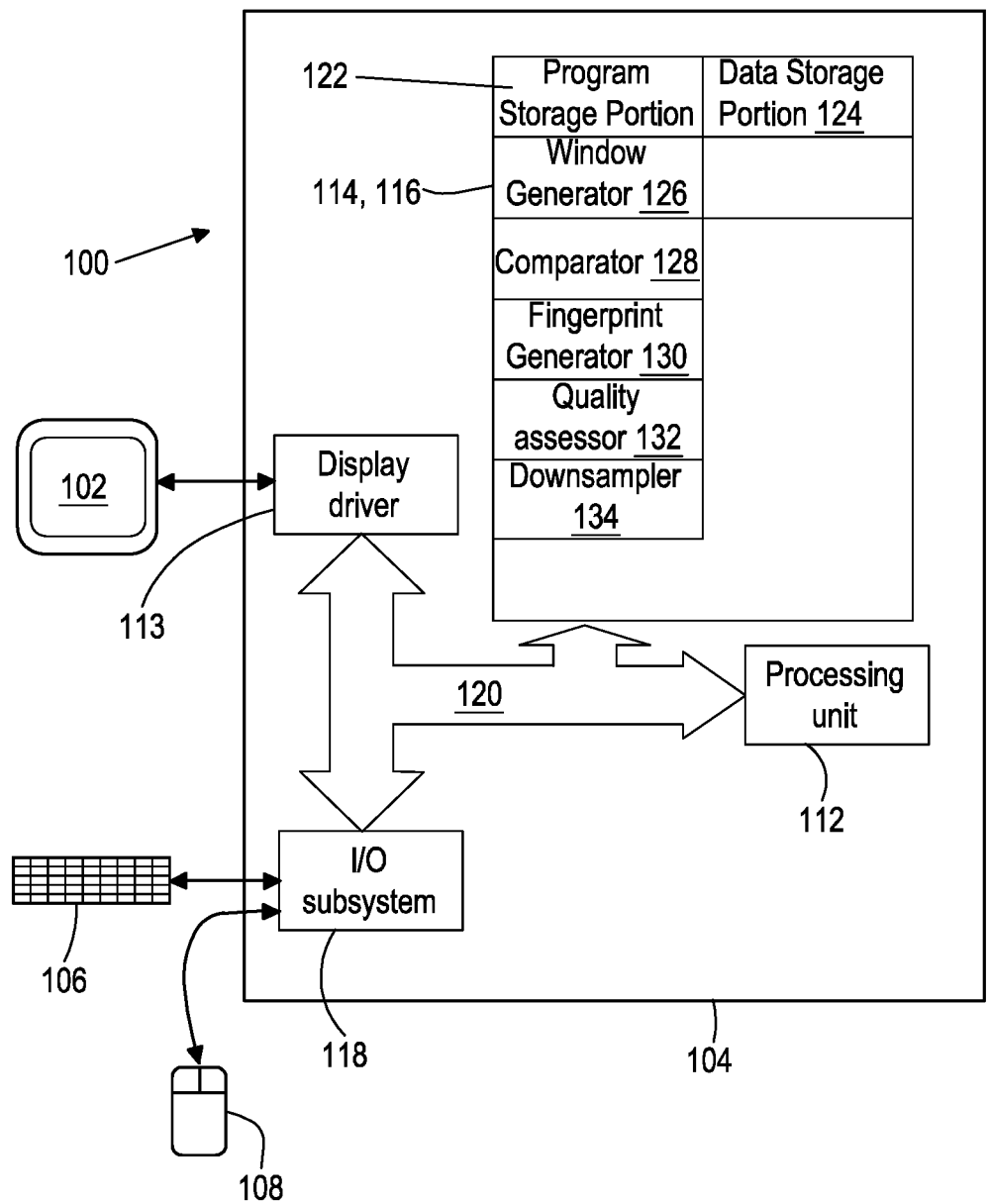

The computer system 100 of FIG. 1 exemplifies a computer system that may be used to provide the computer implemented methods described herein or as a computer system described herein. The computer system 100 comprises a display 102, processing circuitry 104, a keyboard 106 and a mouse 108. The processing circuitry 104 comprises a processing unit 112, a graphics system 113, a hard drive 114, a memory 116, an I/O subsystem 118 and a system bus 120. The processing unit 112, graphics system 113 hard drive 114, memory 116 and I/O subsystem 118 communicate with each other via the system bus 120, which in this embodiment is a PCI bus, in a manner well known in the art.

The graphics system 113 could comprise a dedicated graphics processor arranged to perform some of the processing of the data that it is desired to display on the display 102. Such graphics systems 113 are well known and increase the performance of the computer system by removing some of the processing required to generate a display from the processing unit 112.

It will be appreciated that although reference is made to a memory 116 it is possible that the memory could be provided by a variety of devices. For example, the memory may be provided by a cache memory, a RAM memory, a local mass storage device such as the hard disk 114, any of these connected to the processing circuitry 104 over a network connection. However, the processing unit 112 can access the memory via the system bus 120 to access program code to instruct it what steps to perform and also to access data to be processed. The processing unit 112 is arranged to process the data as outlined by program code.

Indeed, in some embodiments it is entirely possible that a number of computer systems 100, processing circuits 104 and/or processing units 112 may be connected in parallel, and/or distributed across a network, in order to provide the method and/or computers systems described herein.

A schematic diagram of the memory 114,116 of the computer system is shown in FIG. 1. It can be seen that the memory comprises a program storage portion 122 dedicated to program storage and a data storage portion 124 dedicated to holding data but the memory need not be so structured.

In the embodiment being described, the program storage portion 122 comprises at least some of the following: a window generator 126, a comparator 128, a fingerprint generator 130, a quality assessor 132 and a downsampler 134 as described below. It will become apparent from the following that some of the processing circuits described may comprise only some of the elements shown in relation to FIG. 1.

Turning to FIG. 2 then an overview of a fingerprint generation system 200 is shown. It is convenient to describe the system 200 in terms of monitoring, identifying and/or processing media-components, such as multimedia including video which may or may not be provided as a stream and in particular may be provided as an Internet Stream. However, embodiments need not be so limited.

The system 200 comprises at least one, and typically several reference fingerprint generators 202*a*, 202*b*, 202*c*, 202*d*. Each of the reference fingerprint generators 202*a*-202*d* may comprise a processing circuit and have an architecture as described in relation to FIG. 1. It is conceivable that reference fingerprint generators 202*a-d* are provided as virtual machines but typically embodiments, including the embodiment being described, will provide the reference fingerprint generators as hard-ware devices which are associated with reference media streams 204*a-d*.

Further, each of the reference fingerprint generators 202*a*-202*d* has input thereto at least one reference media stream 204*a*, 204*b*, 204*c*, 204*d*. This reference media stream 204*a-d* may be thought of as a reference media-component. Embodiments of the reference fingerprint generator may however not have displays 102 or may indeed not contain graphics systems 113.

Typically, the reference fingerprint generators 202*a-d* are situated, in the case of monitoring media streams, within a media generating organisation, such as a broadcaster or the like. The reference media stream 204*a-d* is typically arranged so that it is a T off a broadcast feed in order not to interfere with the broadcast.

Each of the reference fingerprint generators 202*a-d* functions as described below and generates fingerprints from the reference media stream 204*a*-204*d* to generate a sequence of reference fingerprints RFPn (where n is intended to be an integer number). The reference fingerprint generator 202*a-d* is then arranged to output the generated reference fingerprints (ie the sequence of reference fingerprints) to a further processing circuit 206 which hosts a system to process the received reference fingerprints RFPn. Thus, the reference fingerprint generators 202*a*-202*d* are connected, typically via Wide Area Network such as the Internet, to the processing circuit 206 via connections 208*a*, 208*b*, 208*c*, 208*d*. The processing circuit 206 may also have an architecture similar to that shown in FIG. 1 (such as an X86 architecture or the like), a virtual server, a plurality of such machines/virtual machines, or the like.

As described in more detail below, the processing circuit 206 processes the received reference fingerprints RFPn within the sequence and stores them within a store 210 which thus provides a store of reference fingerprints. The store 210 may be thought of as an asset store. In the embodiment being described, the store 210 is connected to the processing circuit 206 via a network connection 212, which may be a Wide Area Network connection such as the Internet. Thus, in the embodiment being described the processing circuit 206 and the store 210 are provided in two separate machines. However, the skilled person will appreciate that in other embodiments, the processing circuit 206 and the store 210 may be provided within a single machine or more than two machines.

Connected to the store 210, via network connections 214*a*, 214*b*, 214*c*, 214*d*, which again may be Wide Area Network connections such as the Internet, is at least one and typically a plurality of identification processing mechanisms 216*a*, 216*b*, 216*c*, 216*d*. In the embodiment being described there are four such identification processing mechanisms 216*a-d* but in other embodiments that may be any other number. It is an advantage of some embodiments that it is highly scalable as further fingerprint generators 202 and/or identification processing mechanisms 216 can be added to the system 200 in order to increase its throughput. The identification processing mechanisms 216 may be provided by machines having an architecture similar to that in FIG. 1 or may be provided within a virtual environment such as a virtual server or the like in a cloud environment. As with the reference fingerprint generators 202 the identification processing mechanisms 216 may not be provided with a display 102 and/or graphics systems 113.

A monitoring system 218 is arranged to monitor and/or identify media components existing on data sources accessible by the system. In the embodiment being described the media components are media streams, such as videos and may be Internet streams. In the embodiment being described, these are found via links on the World Wide Web (WWW) and thus, the data-sources are provided by websites, user-forums, chat-rooms or the like that are accessible over the WWW. In other embodiments the data being monitored may be other than media streams and may in particular be non-streamed media such as an audio file (eg mp3; way; or the like) or a video file (such as MP4; WMV; or the like). Thus, the monitoring system 218 is arranged to receive a candidate media-component which it is arranged to process as described herein.

In alternative, or additional, embodiments, the system may be arranged to monitor sources of media-components over a network other than the WWW. For example, the network 251 may be the Internet (and not the WWW) and the data-sources may be provided by FTP (File Transfer Protocol) sites, or the like.

The monitoring system is typically provided by a plurality of processing circuits, which may be physical machine, virtual machines or a mixture of both.

In the embodiment being described, the monitoring system 218 is also arranged to generate sequences of candidate fingerprints CFPn (where the n is intended to be an integer number) for what may be termed one or more candidate media-components that the system 200 is arranged to monitor. Typically a sequence of candidate fingerprints CFPn is generated for each of the candidate media-component. In other embodiments, the system may not generate the candidate fingerprints CFPn.

In the embodiment being described, the candidate media-component is a media stream and in particular may be a video and in particular may be an Internet stream. Thus in this embodiment a identification processing mechanism 216a-c is arranged to process a sequence of candidate fingerprints CFPn from an input media stream 219.

The, or each, sequence of candidate fingerprints CFPn generated by the monitoring system 218 are then queued in a queue 220 for analysing by the system 200. The system 200 is then arranged such that one of the sequences of candidate fingerprints CFPn from within the queue 220 is assigned to an identification processing mechanism 216a-d which uploads the sequence for further processing. In the embodiment being described the sequences of fingerprints uploaded to an identification processing mechanism 216a-d at a given time are typically representative of one minute of media-stream. A one minute stream, which provides a relatively short period, is particularly convenient for embodiments that are processing streamed media, perhaps so-called live streamed media.

Some embodiments may be arranged to process an entire, or at least substantially all of a media-component (eg a media file) and generate candidate fingerprints therefore.

That identification processing mechanism is then arranged to perform a search for each of the candidate fingerprint CFPn within that sequence to see if that fingerprint CFPn corresponds to (ie matches) any of the reference fingerprints RFPn stored within the system 200. This search process is described further below.

Additionally, or alternatively, embodiments of the identification processing mechanisms may be assigned a single fingerprint CFPn from the queue 220.

Figure 3:
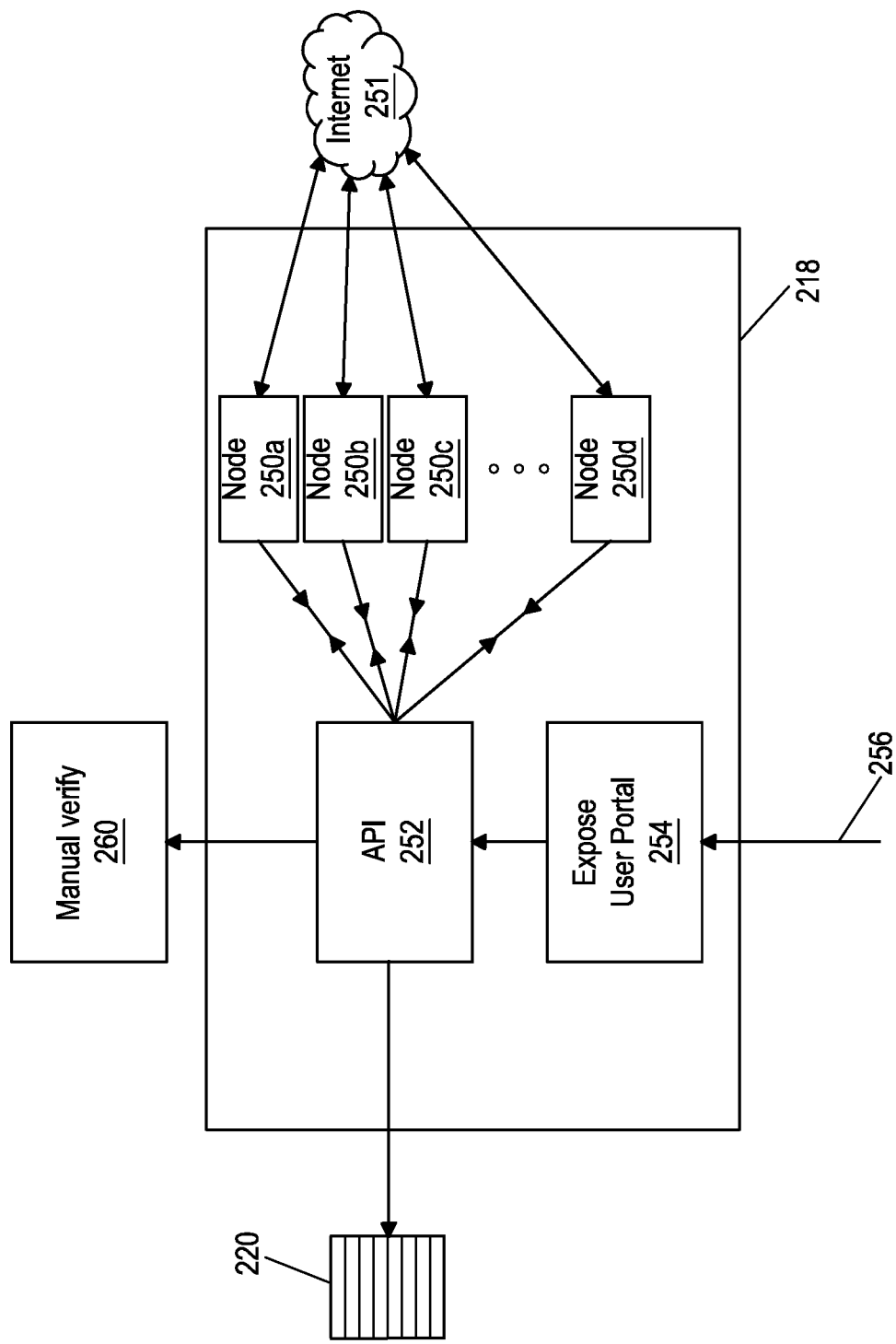
FIG. 3 shows a diagram outlining the processes and data stores performed by an embodiment of a monitoring system.

FIG. 3 shows an enlargement of the monitoring system 218 of FIG. 2 and is now explained in more detail.

In a similar manner to the identification processing mechanisms 216a-d shown on FIG. 2, the monitoring system 218 comprises a plurality of tailorable processing mechanisms 250a-d. In this embodiment only four tailorable processing mechanisms are shown but in reality there could be a significant number more. Each of the tailorable processing mechanisms is connected to a Network 251.

Each of the tailorable processing mechanisms might be a physical machine, such as exemplified in relation to FIG. 1. Should the tailorable processing mechanisms be provided as physical machines then they might not comprise a display or display driver, etc. In alternative, or additional embodiments, including the embodiment being described the tailorable processing mechanisms may be provided as a virtual machine.

Each of the tailorable processing mechanisms is controlled by an Application Programming Interface (API) 252 of the system and thus, the system is arranged to control the functionality of the tailorable processing mechanisms 250. It will also be seen that the API is arranged to generate the queue 220 described above.

A user portal 254 allow user input 256 to be made to the API 252 thereby allowing the functionality of the tailorable processing mechanisms 250 to be controlled.

Figure 4:
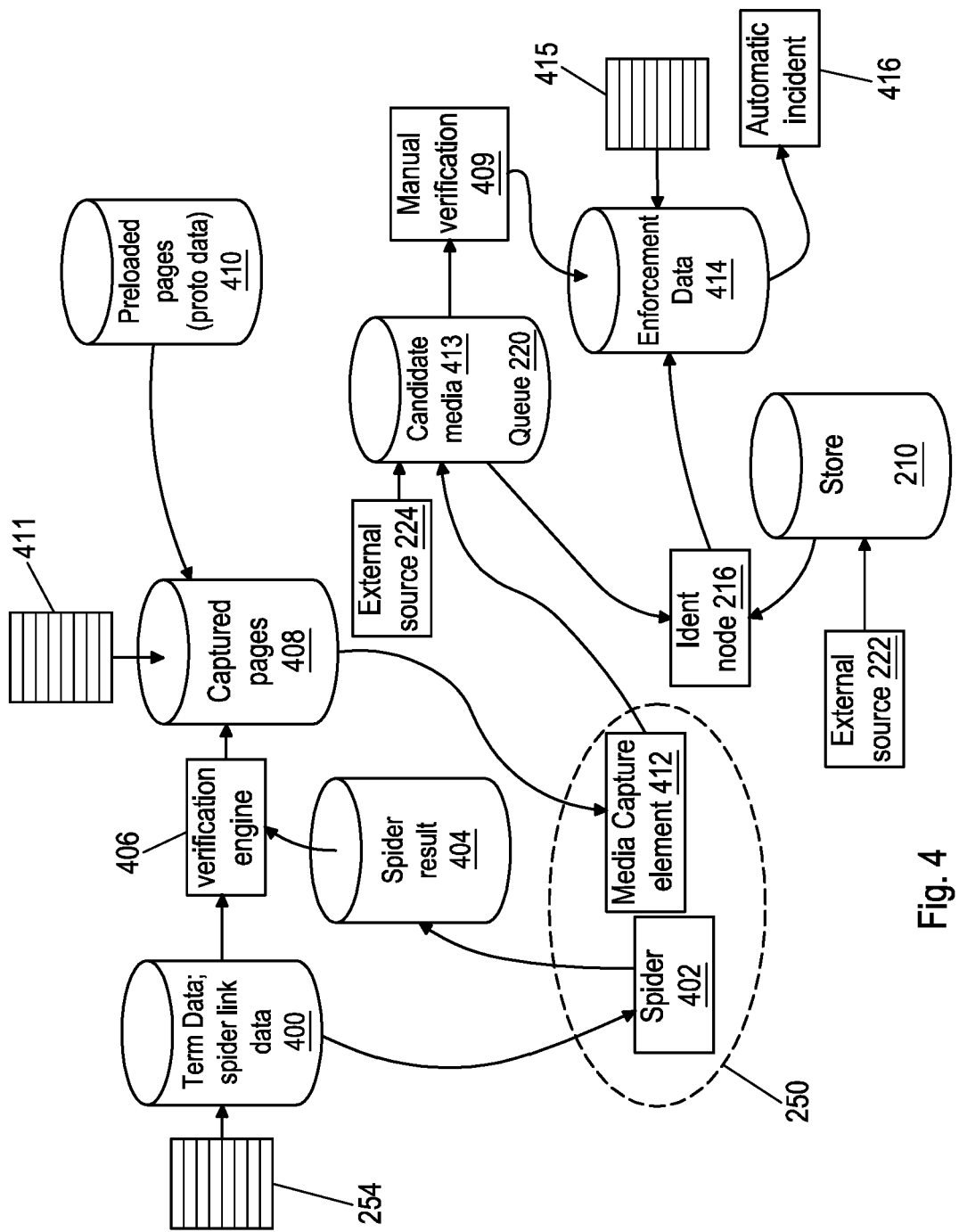
FIG. 4 shows a further detail of a portion of the monitoring system described with reference to FIG. 3.

FIG. 4 expands on the process flow of the system outlined with reference to FIGS. 2 and 3. It should be noted that FIG. 4 is a flow diagram rather than a structural diagram but the description below relates aspects of FIG. 4 to the system diagrams of FIGS. 2 and 3.

The system 218 maintains term-data that can be used to locate one or more candidate media-components for analysis by the system. As such a term-data store 400 is maintained for processing as later described. The term-data held within the store 400 may comprise URL (Universal Resource Locator), search terms, or the like any of which may be used to locate media-components on the network 251.

Terms, URL's or other term-data, may be input into the term-data store 400 via the user portal 254.

The tailorable processing mechanisms 250 shown in FIG. 3 are arranged to act as spiders 402 to collect information from the network 251 from given data-sources on the network, which in the embodiment being described are typically web-pages. In this process, the API 252 assigns a given tailorable processing mechanism 250 a data-source to process, which data-source may be given by the term-data given to the tailorable processing mechanism 250.

For example, if the term-data were a search term then the tailorable processing mechanism 250 is arranged to search the network, or at least a given web-site, or a page of a web site for that search term. If the term-data were a URL then the tailorable processing mechanism 250 is arranged to process that URL. The term-data may include specifying which portions of web-page, site or the like should be searched. In particular, some embodiments may specify tags, parameters, such as XML tags or parameters that should be searched.

The spidering function that the tailorable processing mechanisms 250 are arranged to provide searches the data-source assigned to the tailorable processing mechanism 250 by the API 252 and returns data that might match specified criteria given by the term-data.

In the embodiment being described, the specified criteria would be a media stream that could potentially match a media stream for which the store 210 holds a reference fingerprint RFPn representative of that media stream. However, additionally, or alternatively, the tailorable processing mechanism 250 may be arranged to capture other forms of data, including media-components, such as any form of media file, the data-source suspected of hosing a media-component, or the like.

The tailorable processing mechanism 250 providing the spidering function 402 is arranged to upload the results of tasks that they have been assigned to perform to a spider-results store 404.

The spider results held within the spider-results store 404 are processed by a verification engine 406 which is also arranged to verify data submitted directly via the user portal 256 which is sent directly to the verification engine rather than being located by the spidering function 402 of the tailorable processing mechanisms 250. In particular, the verification engine is, in at least some embodiments, arranged to score meta-data and return a belief (which may be thought of as being an importance factor) in that meta-data. Some embodiments of the system, including the one being described, may then use that belief in how any determination of that meta-data should be used in determining a schedule based upon that meta-data. Here the meta-data might comprise text, XML or HTML tags, or the like that has been scraped, by the spider 402, from the data-source (eg web-page) that it has processed.

In the embodiment being described, the verified results of the spidering 404/information input directly to the system is stored within a store of captured pages 408 for subsequent processing. Reference here to a store of captured pages 408 is suitable for embodiments in which the network 251 is the World Wide Web. However, in other embodiments the store may be more suitably termed a store of captured proto-data; ie data that is potentially relevant and should be further processed by the system.

It is possible for data to be input directly to the captured pages store 408 and this is represented as the input 411 on the Figure. Typically such data would be input via the User Portal 254.

It is again possible that proto-data can be input directly to the store of proto-data, which in the embodiment being described may be thought of as being a pre-loaded pages 410. Such preloaded pages (or other repositories of data) may be pages that are routinely found to host data, such as media streams, or other media data, that meets the specified criteria. In the embodiment being described, the system is arranged to monitor and identify media streams that are copies of the reference media streams 204 and as such, the specified criteria might be that those pre-loaded pages routinely host media streams that are copies of reference media streams 204. In other embodiments, the system is arranged to monitor other than media stream and may be arranged to monitor or otherwise identify any form of media file, or indeed other forms of data.

The proto-data, which in this embodiment are the captured and/or pre-loaded pages, are then processed by media capture elements 412 which may be provided by the tailorable processing mechanisms 250a-d. Again, these media capture elements 412 are controlled by the API 252 which directs and schedules the activity of the media capture elements 412. Thus, in the embodiment being described, the same tailorable processing mechanism 250 is arranged to perform both as the spider 402 and as the media capture element 412. Such an arrangement in which the tailorable processing mechanism 250 had a dual function is believed advantageous because it can lead to an efficient use of resources within the system. Other embodiments, may provide the spider 402 and media capture elements 412 as separate entities.

In the embodiment being described, the media capture elements 412 are arranged to process candidate media streams 219, located within the data-sources (ie web pages), and generate candidate finger prints CFPn and thus, the media capture element 412 provides a candidate fingerprint generator. These candidate finger prints CFPn are stored in the queue 220 for further analysis by the system.

In addition to the generation of the candidate finger prints CFPn the media capture element 412 is arranged to store a copy of at least a portion of the candidate media-component within a store of candidate media 413. For example, should the candidate media-component be a video stream then the media capture element 412 may be arranged to store one or more thumbnails representing the video stream. Here, a thumbnail is intended to mean a version in which the or each frame is of a reduced resolution, colour content, frame rate, or the like, in order to reduce the amount of space taken to store the thumb-nail when compared to the original media-component.

Should the candidate media-component be an audio file then the media capture element may be arranged to store a version of the audio of file of reduced quality, reduced length, etc.

In the embodiment being described, the media-capture element 412 is also arranged to store, in the store of candidate media 413, meta data associated with the candidate media-component. The meta-data stored within the candidate media 413 for each candidate media-component may include any of the following: the URL that pointed to the media-component (eg media-stream); the IP address from which the media-component (eg media stream) was obtained; the time at which the media-component (eg media stream) was obtained; or the like. This meta-data may be further stored as enforcement data 414, in at least the embodiment being described, which specifies the source from which the media-component (eg media stream) was obtained.

The functionality of the media-capture element is described below in relation to FIGS. 5 and 6.

It is also possible that candidate fingerprints CFPn can be added to the queue from an external source 224. In some embodiments there may be multiple external sources from which candidate finger prints CFPn can be added to the queue 220. An example of the external source may be given by the user portal 254.

Once the candidate fingerprints CFPn have been added to the queue 220 they are processed by the identification processing mechanisms 216 under the direction of the API 252. The identification processing mechanisms 216a-d make comparisons against the Reference Fingerprints RFPn held within the store 210 as described elsewhere.

In the embodiment being described, in addition to the automated identification/monitoring process that is described below users may manually inspect media-components held in the store of candidate media 413. This process is via the user portal 254 and is shown as process 409. In this process a user is presented, on a video display, a copy of the media-component. In the embodiment being descried, the user is presented with the thumb-nail of the candidate media-component that has been generated by the media capture element 412.

A manual verify unit 260 is shown on FIG. 3 which may be provided on some embodiments and which allows a user to provide the process 409. The manual verify unit 20 provides a user with an input to the system. This input might also be via the user portal 254. However, in other embodiments, the manual verify unit 260 may not be provided and the system may function automatically.

Should a candidate media-component be identified as one that needs further action, then any meta-data associated with the media-component is captured by the media capture element 412 and associated with that candidate media-component is transferred to the store of enforcement data 414 for action as described hereinafter. Thus, an advantage of such embodiments is that meta-data is captured for the candidate media stream 219 which can then be used to automate processes, such as the generation of take down notices, in relation to that media stream 219. This capture of meta-data may be accomplished in embodiments which automatically identify a media-component as well as those with a manual identification.

The spider 402 and the media capture element 412 will typically be provided by machines, whether virtual or physical or a combination thereof, which are within, directly connected to, or the like, the network 251. It will be appreciated that such embodiments are advantageous as the spider 402 and media capture elements 412 make regular access to the network 251 and thus proximity to the network 251 is advantageous in that it will reduce network traffic.

Further, at least some embodiments, including that being described, arrange the identification processing mechanisms 216 such that are separated from network 251. Such separation may be provided by a firewall, Demilitarized Zone (DMZ), or the like. It will be noted that in some embodiments, including that being described, identification processing mechanisms 216 are more closely connected to the system 200 when compared to the spider 402 or the media capture element 412 and as such it is advantageous to separate them from the network 251 to increase the security of the system 200. Thus, embodiments that structure the identification processing mechanisms 216 such that they are protected from the network 251 address the security of the system.

Once the identification processing mechanisms 216 have identified Candidate Fingerprints CFPn as being a match to a reference Fingerprint RFPn held within the store 210 they are, in the embodiment being described, arranged to upload, or otherwise transmit, details of the media-component (eg the media stream in this embodiment) to an enforcement data store 414, which includes meta-data associated with the candidate media-component.

In at least some embodiments, it is possible for enforcement data to be added directly to the store 414 and this is represented by the element 415 in the Figure. Such data may be added via the user portal 254.

Other, alternative or additional, embodiments may be arranged to analyse data and such analysis may provide business intelligence or information in relation to the media-components being monitored. In such embodiments, the identification processing mechanisms 216 may be arranged to store the data identified by the system for a candidate media-component for subsequent analysis. Typically the data identified by the system is stored with reference to the candidate media-component that gave rise to that data.

In the embodiment being descried, a further, takedown, process 416 is provided which is arranged to process the data held in the enforcement data store 414 and send take down notices to the recipients specified by the enforcement data. In this embodiment, those notices are sent by email but in alternative, or additional, embodiments the take down notices may be sent by post; fax; Instant Messenger; SMS; MMS; or the like.

Embodiments of the system may also be arranged to continue to monitor the data-source (which in the embodiment being described may be links, or the like) that gave rise to the enforcement data that gave rise to a takedown notice. This continued monitoring may occur from time-to-time, which may be periodically at predetermined intervals. For example, the spider 402 and/or the media capture element 412 may be arranged to monitor a data-source substantially at every 10 minutes, 15 minutes, 20 minutes, 30 minutes, or the like.

If the system determines that the media-component that caused the take down notice to be generated is still available from the media-component source then a take-down process may be further escalated. For example, rather than email being sent to a particular web-site then a take down notice may be sent directly to an ISP, or the like.

Embodiments, including the one being described, may be arranged such that the spider 402 and/or the media capture elements 412, from time to time, perform the function assigned to them; regardless of whether this relates to enforcement data.

In the embodiment being described, the spider 402 can be instructed, by the API 252, to repeat the process that was assigned to it in the term-data. The repetition may be performed periodically at regular intervals such as substantially at every 10 minutes, 15 minutes-, 20 minutes, 30 minutes, or the like. Other embodiments may be arranged to repeat the process at irregular intervals.

Indeed, as described above, some embodiments may be arranged to obtain meta-data from the spidering performed by the spider 402; ie data obtained from the data-source about what is held on the data-source. Such embodiments may further be arranged to use the meta-data to set a schedule as to when the spider 402 should repeat the process assigned to it.

Moreover, the media capture element 412 may also be arranged to generate candidate finger prints CFPn from the proto-data (ie the captured pages) from time-to-time. The generation of candidate finger prints CFPn may be achieved by recapturing the page (ie the data-source) on which the candidate media-component is located. The repetition may be performed periodically, at regular intervals, such as substantially at every 10 minutes, 15 minutes, 20 minutes, 30 minutes, or the like. Other embodiments may be arranged to repeat the process at irregular intervals.

In some embodiments, the system may omit the Enforcement data store 414 and the takedown process 416 and simply be arranged to generate usage data.

Figure 5:
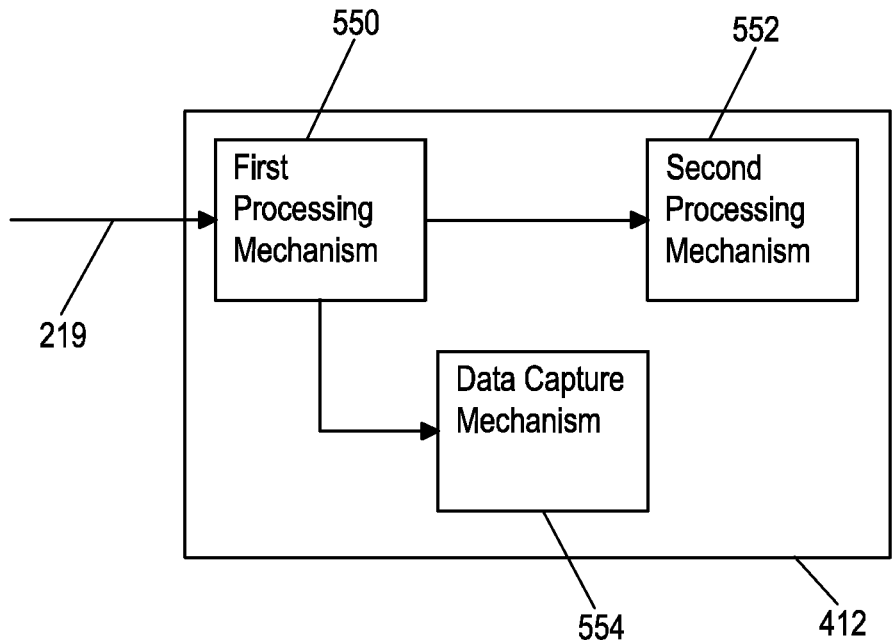
FIG. 5 shows a further detail of a portion of the monitoring system described with reference to FIG. 4.
Figure 6:
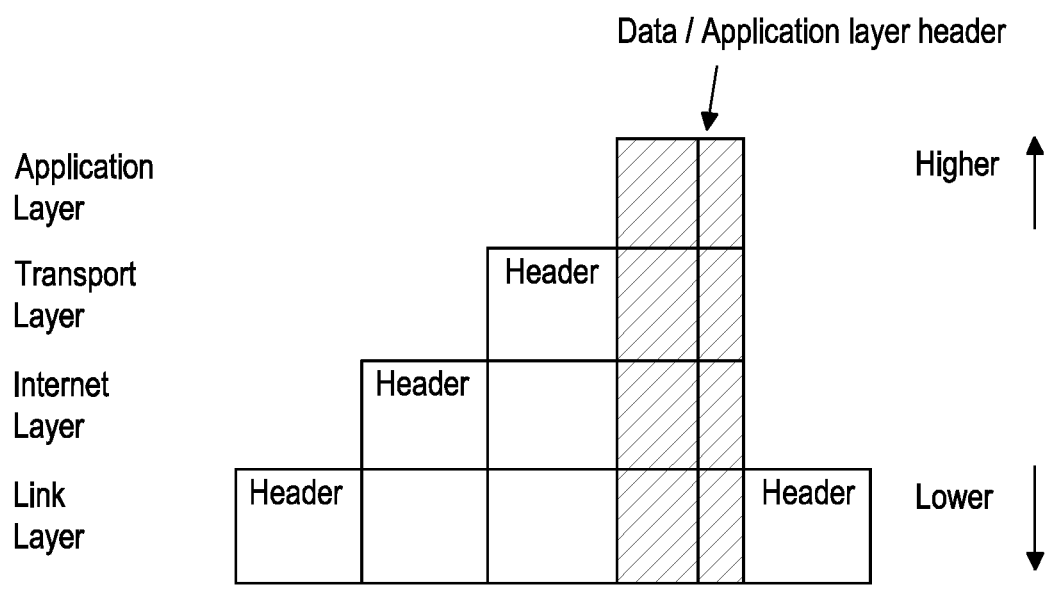
FIG. 6 (prior art) shows the network packets that are passed over a network.

FIG. 5 shows further details of processes that run within side the tailorable processing mechanism 250 and in particular the media capture element 412 that can be provided by the tailorable processing mechanism 250. Reference is also made to FIG. 6 which is used to illustrate the data packets discussed in relation to FIG. 4.

As described above, the media capture element 412, in the embodiment being described, captures a media stream 219 that has been identified by the monitoring system 218 as needing further investigation. In other embodiments, the media capture element 412 may be arranged to capture other media-components other than streamed media.

In order to capture the media-components, and in the embodiment being described, the media stream 219, the media capture element 412 comprises a first processing mechanism 550. The first processing mechanism functions as a media-server and receives the incoming media-component (in this embodiment the media stream 219) and retransmits that media-component to second processing mechanism 552.

In the embodiment being described, the first and second processing mechanisms are provided by virtual machines providing simulated processing circuitry 104. The skilled person will appreciate that first and/or second processing mechanisms 550, 552 may be provided as physical machines. However, in the embodiment being described, providing the first and second processing as virtual machines allows flexibility as to the location of the monitoring system 218 and makes it simpler to create further tailorable processing mechanisms 250, which provide the media capture elements 412, to expand the monitoring system 218. Thus, the first 550 and second 552 processing mechanisms are, in the embodiment being described, provided within a single virtual machine.

In the embodiment being described, the network 251 is the World Wide Web (WWW) running on top of the Internet. Other embodiments might of course use other architectures. However, FIG. 6 exemplifies the four layers of a WWW network, such as may be utilised for network 251. There is the link layer which is specific to the hardware providing the connection and header information of the link layer is not monitored in the embodiment being described. However, it is conceivable that in other embodiments the data packets from the link layer may be monitored and/or captured.

However, the media capture element 412, and in particular a data capture mechanism 554 thereof, is arranged to capture the header information from each of the Internet, Transport and Application layers. Thus, it will be appreciated that the data, which in the embodiment being described, is one or more packets of media data is surrounded by more header information in the lower layers. The skilled person will appreciate that in some protocols the application layer will contain header information and therefore the data block (as represented by the shaded block on the Figure), on all layers of the diagram, may in fact contain both data and application layer header information.

Data contained in the header information is useful in determining the source of a media-component of the data and may be thought of as providing meta data associated with the media (or other data) being transmitted across the network. The skilled person will appreciate that the websites, or other sources of data on networks other than the WWW, may re-direct users to other sources without the user realising. Inspection of the header information can be used to determine whether this has occurred. Previously it has been a problem to understand the ultimate source of a media-component, for example a media stream, media-file, etc., and inspection of the header information as used by the embodiment being described can be used by the take-down process 416 to send notices to the ultimate source as located by the header information, record the identity of the ultimate source, etc.

In the embodiment being described, the media-component may be streamed in a Network stream format which is processed to determine the sections of the stream that are associated with the control and stream setup; and those associated with the media content. From the control and stream setup data the protocol specific syntax used in the establishment of the media stream are saved and used to aggregate multiple sources of the same media embedded on different web pages. Here, it will be appreciated by the skilled person that a plurality of web-sites may provide access to the same stream, where the stream may be thought of as being the ultimate source of the media-component. As such, it can be advantageous to aggregate the sources of media-components such that it is more evident how widely that source of media-component is being distributed.

The actual stream content is saved in a file format and forms the candidate media content which is processed to generate candidate fingerprints as described elsewhere.

The skilled person will also appreciate that technologies exist that deliver media, and in particular streamed media, in a fragmented manner. Examples of such technology include HTTP Live Streaming (HLS), Microsoft Smooth Streaming, Adobe™ HDS (Adobe Dynamic Streaming) or bespoke mechanisms. Embodiments that re-stream media-components as described in relation to FIG. 5 are advantageous as they allow such technologies delivering content in a fragmented manner to be processed and media content to be saved in a file format and subsequently processed. It can be a problem to process and fingerprint such fragmented streams in view of the short duration of the fragments.

Some embodiments of the system may be arranged to process media-components that do not correspond to a known format. Some embodiments of the system may be able to re-combine audio and video files from separate streams/files. Such functionality typically arises from the processing of the header information of the various layers of the network traffic.

In the embodiment being described, the data capture mechanism 554 is arranged, to reconstruct media-components delivered in such a fragmented manner. In particular, the data capture mechanism 554 is arranged to analyse the header information of at least some of the layers and to use that header information to re-construct the data packets (which in the embodiment being described provide the media) into a non-fragmented format; ie to save the content as a file format. Thus, in the embodiment being described, the data capture element 554 is arranged to process the header information of the various layers and to detect an HLS (or other fragmented) video stream, to capture the data, which will in this case be frames of video, from the various network packets and to stitch (ie aggregate) the data together to form a media file providing a continuous media sequence. The media file can then be processed, such as being fingerprinted, as described elsewhere.

In order to generate a reference fingerprint RFPn each of the reference fingerprint generators 202*a*-*d* processes the reference media stream 204*a*-*d* (ie the reference media-component) as is now described. It will be appreciated that the described technique to generate fingerprints is provided as an example and other embodiments may use other fingerprinting techniques.

The process is also exemplified in relation to FIGS. 7 and 8. FIG. 7 represents the incoming media stream as a sequence of frames; eg 300*a*, 300*b*, 300*c* etc. (step 800). Each frame of the media stream may be thought of as being a data-element of the media-component. Other embodiments may process other forms of data.

A similar process is also performed within the monitoring system 218 in order to generate the sequence of candidate fingerprints CFPn and again FIG. 7 represents the candidate media stream 219 as a sequence of frames 306*a*-*n*.

In the embodiment being described, the reference fingerprint generators 202*a*-*d* are arranged as a first step to remove information from the media stream. In the embodiment being described the reference fingerprint generator is arranged to convert the frames to greyscale 802 in order to reduce the size of the data to be processed. It will be appreciated that for embodiments that are arranged to process video in real time it can be helpful to reduce the amount of data in order to increase the speed at which reference fingerprints can be generated. It has been a problem to generate fingerprints (ie reference fingerprints) for data, such as a video or video streams, which can be generated in real time and yet allow robust detection of media streams that give rise to the same, or at least similar, fingerprints (ie candidate fingerprints). It is believed that at least some embodiments described herein solve this problem.

In embodiments in which the media-component (the media stream in the embodiment being described) is other than video data the quality may be removed from by removing one or more frequencies, removing stereo or other multi-channel information, or the like. Alternatively, or additionally, other embodiments might process channels of a media within a media-component separately.

Next the reference fingerprint generators 202*a-d* are arranged to re-size the frames 300*a-n* in order that the frames 300*a-n* have uniform dimensions 804. In the embodiment being described the frames are re-sized to be 32×32 pixels thereby reducing the quality of the media stream. The reference fingerprint generators are further arranged to maintain the aspect ratio of the frames such that black bars are added to the top/bottom or edges of the frames in order to maintain the aspect ratio of the frames in the re-sized state.

In other embodiments, the media streams may be re-sized to be a size other than 32×32 pixels. It will be appreciated from the discussion that follows that embodiments that use a larger size will generate a higher number of possible fingerprints thereby reducing the chance of false positives but also that the processing involved to generate the reference fingerprints increases. Accordingly embodiments using 32×32 pixels have been found to give a good balance between a number of factors including the number of potential fingerprints, the processing required in order to process media streams in real time (or at least pseudo-real time), and the storage required to store the re-sized media stream.

In the embodiment being described a second copy of the frames 300*a-n* is re-sized to 16×16 pixels and used to determine an amount of movement (ie change) between consecutive frames 300*a-n*.

The re-sized greyscale frames are then fed into two separate buffers, which in the embodiment being described are circular, each arranged to hold portions of the media-component (step 806). The greyscale frames resized to 32×32 pixels are fed into a first of these buffers and used to generate a fingerprint and the greyscale frames resized to 16×16 pixels are fed into a second of these and used to detect change. In the embodiment being described, each of the portions fed into the two buffers is 4 seconds in length and comprise portions of the reference media stream 204*a-d*. Generation of the fingerprints using the resized frames held in the first of the buffers is now described.

Once the media stream 20*a*4*a-d* is received then no action occurs until the buffers are filled but then reference fingerprint RFPn generation is triggered and a reference fingerprint is then generated at intervals of one half second. Other embodiments may be provided with different length buffers and/or may generate reference fingerprints at other than one half second intervals. Other embodiments may for example have buffers that are substantially any of the following lengths (in seconds); 2, 3, 5, 6, 7, 8, 10, 20, 30, 60. Further other embodiments may be arranged to generate reference fingerprints at substantially any of the following periods (in seconds): 0.1; 0.25; 1; 2; 3; 5; 10; 60.

The buffered stream of frames therefore comprises a sequence of frames each comprising X by Y pixels. Thus, a pixel at (x,y) within a frame can be located in each of the frames and this may be thought of as a tube of pixels running across the frames within the buffer. As such, the buffer contains X by Y tubes of pixels and in the embodiment being described there are 32×32 tubes; 1024 tubes.

As a first step in the reference fingerprint generation, each of the tubes of pixels is smoothed. In the embodiment being performed this is achieved with a Gaussian profile step 808.

Next the content of the buffer is down sampled to a frame rate of 8 frames per second step 810. As such, a four second buffer contains 32 frames of down sampled media stream. Thus, there are now 32 frames each of 32 by 32 pixels; a total of 32,768 pixels.

Thus, each of the reference fingerprint generators 202 may be thought of as containing a downsampler 134 which is arranged to process the incoming media stream or other data before that media stream is processed as described below. Such a downsampler 134 may be arranged to perform one or more of the processing steps as described above: conversion of the media stream to greyscale; re-sizing of the media stream which in the embodiment being described was to 32×32 pixels; addition of the black-bars; and downsampling of the frame rate, which in the embodiment being described was to 8 fps.

Next, the reference fingerprint generators are arranged to perform a Discrete Cosine Transformation (DCT) on the 32×32×32 cubes (step 812); ie in this embodiment a three dimensional DCT is performed (3D). It will be appreciated that embodiments that perform the DCT on equally sided cubes of pixels are advantageous in view of the optimisation that can occur in the DCT thereby reducing the amount of processing. As such, in other embodiments, should the X or Y dimensions to which the frames 300*a-n* are re-sized be altered then it may also be convenient to alter the number of frames to which the media stream is downsampled.

Thus, it will be appreciated the frequency components of the media-component (the media stream in this embodiment) are extracted. In the embodiment being described this extraction of the frequency component is performed by the DCT but other embodiments may use other mechanisms to achieve this. For example, other embodiments may also use a Fourier Transform, a Discrete Fourier Transform, a Cosine Transform, or the like.

The DCT provides a series of coefficients each representing a frequency component of the 4 second block of the reference media stream 204*a-d* that has been processed. Because the DCT is a 3D DCT and has been performed not only in two-dimensions (XY of the frame) but in the time dimension, across the frames, the resulting reference fingerprint is termed a spatio-temporal fingerprint. In the embodiment being described the 2nd to 5th coefficients, in each of the three dimensions, are selected for further processing (step 814). In other embodiments a different set of coefficients may be selected however, embodiments using the 2nd to 5th coefficients are felt to be advantageous as these coefficients tend to capture the greatest change within the frames of the reference media stream 204*a-d* thereby providing for robust identification of candidate media-component against the reference media-component. These extracted frequency components, in the embodiment being described, provide the basis of the fingerprint that is generated.

Next the reference fingerprint generators are arranged to quantise the selected coefficients (in this embodiment this is the 2nd to 5th coefficients) about the median value of the selected coefficients (step 816). Thus, there are 4×4×4 coefficients each of which are stored as a one bit number. Such quantisation results in an equal number of ones and zeros and in the embodiment being described it is arranged to generate 32 ones and 32 zeroes. The fingerprints are schematically shown at 304 in FIG. 7.

Thus, a reference fingerprint 304 is generated according to the content of one of the two buffers. The other buffer is used to detect motion within the 4 second portion of media stream as is now described with reference to FIG. 9. In the embodiment being described, this downsampling is performed on the full frame rate of the input media-component but in other embodiments this might be performed on the downsampled frames. For embodiments processing non-video media-component the second buffer may be arranged to monitor for audio to be present.

Thus, the reference fingerprint generator 202a-d may be thought of as comprising a fingerprint generator 130 which is arranged to perform the steps outlined. Similarly, the monitoring system 218 may also be thought of as comprising a fingerprint generator 130. These fingerprint generators 130 are arranged to generate a sequence of fingerprints from a portion of either the candidate or reference media-components; ie the respective media streams in the embodiment being described.

A quality measure is then generated, which in the embodiment being described may be performed by the quality assessor 132. As a first step, a change in a property between at least some of the frames is determined. In the embodiment being described, the change in property is the difference in intensity between pixels in neighbouring frames (ie the difference in intensity between pixel (x1, y1) in neighbouring frames is calculated) step 900 to generate an inter-frame intensity change. In the embodiment being described, this change in intensity between neighbouring pixels is summed across all of the pixels of the frames for each inter-frame period. In other embodiments a sub-set of the pixels may be summed.

Thus, an array of 31 numbers is generated, with a number for each inter-frame period, there being 32 frames used to generate each quality measure.

Next, the array is sorted in order of magnitude (step 902) thereby creating an ordered array ranging at one end with the highest value at one end of the array to the lowest value at the other end of the array.

Next the reference fingerprint generator 202 or monitoring system 218 is arranged to calculate a predetermined percentile of the array. In the embodiment being described this predetermined percentile is the 95th percentile of the array (step 904). Subsequently value given by the predetermined percentile is normalised by the number of pixels (step 906). This provides a quality measure giving an indication of the amount of inter frame motion which is used during fingerprint comparisons made by the system 200.

Lastly, the reference fingerprint generators 202a-d are arranged to pack the fingerprints generated in step 816 together with the quality measures and uploaded to the store 210 (step 908). Thus, the quality measures are stored in association with the fingerprints. Some embodiments may store the fingerprints and quality measures separately in a manner which they are linked or otherwise associated with one another.

In the embodiment being described, sequences of reference fingerprints RFPns are uploaded in minute intervals and as such 57 fingerprints are uploaded at a time, there being no fingerprints generated for the first 3 seconds of the media stream 204a-d until the buffer becomes full. There is associated with each of the reference fingerprints RFPn a timestamp and the quality measure derived for that fingerprint.

Uploading to the store 210 in minute long batches is felt to provide a balance between quickly getting fingerprints into the store 210 and reducing the network overhead associated with transmitting small amounts of information. As such, other embodiments may be arranged to upload fingerprints to the store 210 at different intervals. For example, other embodiments might be arranged to upload fingerprints individually; or at substantially any of the following time periods: 10 seconds; 30 seconds; 45 seconds; 90 seconds; 2 minutes; 5 minutes; or more.

It should be noted that, in the embodiment being described, although each fingerprint represents 4 seconds of the media stream 204a a fingerprint is generated by the method every half second. Thus, the generation of the reference fingerprints 300a-n may be thought of as there being a window 305 moved through the frames of the media stream 204a (ie to move through the reference or candidate media-components) to have a plurality of positions relative to the media-component (ie the media stream in the embodiment being described). A fingerprint is then generated for predetermined positions of the window 305. Thus, in the embodiment described the buffer of each of the reference fingerprint generator 202 and the monitoring system 218 provides window generators arranged to select respectively a portion of the reference media-component and candidate media-components (ie the media streams) and generate respectively a reference or candidate fingerprint from the portion of the media-component covered by the window.

Thus, window positions generated at consecutive time periods may be thought of as neighbouring window positions. Thus, it can be seen that the window positions 305a at a first time period which generated RFP1 is a neighbouring window position to window position 305b used to generate fingerprint RFP2.

Thus, in the embodiment being described information from any one of the downsampled frames is contained in several fingerprints (eg 4 in the embodiment being described). This can be seen in FIGS. 7 and 8 where it can be seen that Reference Fingerprint 1 (RFP1) contains information relating to frames 300a, 300b and 300c. The second Reference Fingerprint (RFP2) is started from frame 300c. The skilled person will appreciate that FIG. 7 is a simplification and that the number of frames has been reduced in order to increase the legibility of the Figure and that in the embodiment being described, a fingerprint (eg RFP1) is generated from 32 frames (after the down sampling) has been performed.

In the embodiment being described, the store 210 contains two databases: a first database containing reference fingerprints RFPn for reference media streams 204a-d which are currently live and a second database holding reference fingerprints RFPn for non-live media streams. Other embodiments may provide different arrangements of data with the store 210 but it is believed advantageous to provide a database for the fingerprints associated with live reference media streams 204a-d to ensure that the database is reduced in size thereby increasing the speed of access for media streams that are currently being transmitted (ie live media streams).

In the embodiment being described, the or each, database held on the store 201 (in this embodiment two databases) are then replicated out to the identification processing mechanisms 216a-d such that each of the identification processing mechanisms maintains a copy of the, or each, database of reference fingerprints RFPn. Such embodiments are believed advantageous since it is highly scalable and the size of the system can be increased by adding further identification processing mechanisms 216a-d.

In the embodiment being described the store 210 and identification processing mechanisms 216a-d are hosted using a LINUX system and the LINUX shell command rsync is used to replicate the, or each, database out to the identification processing mechanisms.

Typically therefore, once a reference fingerprint 304 (RFPn) has been generated by one of the reference fingerprint generator 202*a-d* it is uploaded to the store 201 within on the order of seconds after the minute interval upload cycle has elapsed. Moreover, embodiments that use the rsync command are believed advantageous as they replicate only changes in the, or each, database on the store 210 out to the identification processing mechanisms 216*a-d* thereby increasing the speed and efficiency at which the upload is performed.

In addition to the generation of reference fingerprints from the reference media streams 204*a-d* the store may be arranged, in some embodiments, to receive reference fingerprints from other sources 222. Such reference fingerprints may subsequently be included in the analysis process described below to determine whether candidate media-components corresponds to reference media-components (eg media streams) that are being monitored by the system 200; media or other data that has a reference fingerprint stored within the store 210 may be thought of as being media (or other data) monitored by the system.

Some embodiments may be arranged to monitor multiple types of media at once. For example, some of the reference fingerprints may be generated from one or more of the following: media streams; video clips; audio streams; audio clips.

Reference fingerprints RFPn uploaded to the store 210 from the external source 222 may be representative of any type of media-component that that embodiment is capable of monitoring otherwise identifying candidate media against.

The monitoring system 218 is arranged to monitor one or more sources of candidate media streams 219. These sources may typically be web sites and the monitoring system may typically be arranged to monitor a plurality of such sources at any one time. Each candidate media stream 219 may be thought of as being a candidate media-component; it will be appreciated that some embodiments might monitor data other than media streams.

Conveniently, some embodiments are arranged to process portions of the candidate media stream of a predetermined length. In particular, embodiments may be arranged to generate fingerprints for substantially one minute long portions of a candidate media stream. It will be appreciated that should the media stream relate to something like a football match then it will be significantly longer than this. However, it will be appreciated that should the embodiment be arranged to monitor and try to prevent transmission of unauthorised media streams then it is desirable to detect transmission of that media stream as soon as possible and as such is not desirable to wait until the transmission of the media stream has finished before generating fingerprints and as such it is advantageous to process the candidate media streams in portions in the same way that it is advantageous to generate fingerprints for portions of the reference media streams. However, it is also not desirable to generate too much network traffic by sending excessive amounts of fingerprints and it is felt that providing embodiments that process portions of the candidate media stream in portions of substantially 60 seconds provides a balance. Again, other embodiments may use a time period of other than 60 seconds.

In use, the monitoring system 218 is arranged to generate, using the same method as outlined in FIGS. 8 and 9, a sequence of candidate fingerprints CFPn for the or each candidate media stream 219. That is, the same method is used to generate the candidate fingerprint CFPn as is used to generate the reference fingerprint. Thus, one or more candidate fingerprints CFPn are generated which are the same, or at least similar, as one or more reference fingerprints RFPn, as long as the underlying candidate media stream from which the candidate fingerprints CFPn are generated (or other data) is the same, or at least similar to, a reference media stream that generated the reference fingerprint RFPn. Thus, embodiments of the system 200 might find application in determining whether candidate media streams correspond to the live reference media streams 204*a-d* which in itself is useful in determine and try to stop the occurrence of on-line piracy and detect copies of reference media streams 204 monitored by the system.

Other embodiments might find other application. For example, the store 210 may provide a library in which candidate fingerprints CFPn generated from a candidate media-component may be identified against the reference fingerprints RFPn held within the store 210. Such embodiments would thus allow a media-component (such as video file; a picture, an audio file or the like) to checked against the store 210 in an attempt to identify that candidate media-component as a match to the media-components referenced in the store 210.

The generation of the candidate fingerprints is again represented schematically in FIG. 7 which shows an incoming candidate media stream 219 represented as a sequence of frames 306*a*, 306*b*, 306*c*, 306*d*. As is the case with the generation of the reference fingerprints, a moving window 308 is moved along the media stream 219 and a Candidate Fingerprint $CFP_1$-$CFP_n$ is generated for predetermined positions of the window 308. As with the reference fingerprint generation, in the embodiment being described, a fingerprint is generated substantially every half second although each fingerprint covers 4 seconds of frames 306*a-n*. As described above a circular buffer provides a window generator arranged to provide the window to receive and process a portion of the media-component.

As with the generation of the reference fingerprints candidate fingerprints are grouped together before being uploaded to the queue 220. Again, the candidate fingerprints, a timestamp and the associated quality measure are uploaded in groups of 57 candidate fingerprints representing the one minute length of candidate media stream 219 that has been processed.

As described above, the system generates a queue 220 of sequences of candidate fingerprints CFPn to be compared with reference fingerprints RFPn within the store 210. In addition to the candidate fingerprints CFPn generated by the monitoring system 218 candidate fingerprints can be added, in at least some embodiments, to the queue 220 from an external source 224 capable of generating candidate fingerprints CFPn.

Queued sequences of candidate fingerprints are then accessed and removed from the queue 220 by one of the identification processing mechanisms 216*a-d* and that identification processing mechanism then searches the reference fingerprints held within the store 210 for the occurrence of a reference fingerprint RFPn corresponding to that of one or more candidate fingerprint CFPn from the sequence of candidate fingerprints CFPn. This search of candidate fingerprints CFPn tries to locate matching reference fingerprints RFPn within the store 210 thereby identifying the media-component (eg media stream) that generated the candidate fingerprint CFPn as being the same as the media-component (eg media stream) that generated the reference fingerprint RFPn.

Each of the identification processing mechanisms 216a-d maintains a complete copy of the, or each, database from the store 210. In the embodiment being described, this copy is maintained within the Random Access Memory (RAM) of the identification processing mechanism 216a-d. Embodiments with such an arrangement are advantageous due to the speed of processing that this allows. However, other embodiments may hold the copy of the, or each, database within any form of storage that the processing circuitry of the identification processing mechanism 216a-d can access, whether networked to or local to the processing circuitry.

The copy of the or each database within the identification processing mechanism 216a-d is from time to time forced to update itself to reflect any changes within the database(s) on the store 210. Updating may for example be forced to occur substantially on the order of minutes, perhaps substantially on the order of any of the following 30 seconds; every minute; every 5 minutes; every 10 minutes; any time in between these times.

Once the identification processing mechanism 216a-d has obtained a sequence of candidate fingerprints CFPn from the queue 220 it searches at least some, and typically each, of the databases to which it has access to determine whether candidate fingerprints CFPn from the queue match any of the reference fingerprints RFPn that are held within the databases that are searched. Although fingerprints are uploaded to the queue 220 in groups relating to portions of candidate media stream (such as a one minute long portion) each of the 64-bit fingerprints relating to 4 seconds of the candidate media stream is searched against the or each database.

In order to increase the security of a match and reduce the chances of a false positive and/or a false negative fingerprints can be aggregated as described hereinafter. Aggregation may be taken to be a characteristic that is assessed to determine if a candidate fingerprint within a sequence matches a reference fingerprint within a sequence.

The Hamming distance between two bit sequences is equal to the number of bits which differ between the two sequences. In the case of a 64 bit fingerprint, a Hamming distance of 0 is a perfect match, whereas a Hamming distance of 32 shows a complete lack of correlation. In the embodiment being described, because a fingerprint always contains an equal count of I/O elements, the Hamming distance is always an even number. Other embodiments may generate non-even Hamming distances.

Testing on example data suggests that a Hamming distance threshold of around 12-16 is suitable for identifying positive matches between individual fingerprints for embodiments of the system described herein.

It will be appreciated that in the embodiment being described, the Hamming distance is used as a measure to determine whether a reference fingerprints is similar, or the same, as a candidate fingerprint. In other embodiments, different techniques may be used to make this comparison.

Thus each of the identification processing mechanisms 216a-d is arranged to make a comparison of a candidate fingerprint obtained from a sequence of fingerprints from the queue 220 against all of the reference fingerprints RFPn of which the system is aware. Such comparison is typically carried out by the comparator 128 and used to locate reference fingerprints RFPn which match at least one of the candidate fingerprints CFPn.

The identification processing mechanism 216a-d is thus arranged to compare each individual fingerprint (eg each 64 bit number in the embodiment being described) in the candidate fingerprint CFPn that it is processing with each of the reference fingerprints RFPn within the store 210. The identification processing mechanism 216a-d is further arranged to accumulate pairs of candidate and reference fingerprints that match where a match is determined if:

1. The Hamming distance between candidate and reference fingerprints is below, or equal to, a predetermined threshold, which is the embodiment being described is 14; and
2. The quality measure of both candidate and reference fingerprints is above, or equal to, a predetermined threshold, which in the embodiment being described is 3.0.

Thus, in the embodiment being described, the Hamming distance and/or the quality measure may be taken to be a characteristic that can be assessed to determine if a candidate fingerprint within a sequence matches a reference fingerprint within a sequence This matching between the candidate and reference fingerprints (RFPn) is exemplified in FIG. 11a in which a sequence of reference fingerprints generated from a reference media stream 204a is shown above a sequence of candidate fingerprints (CFPn) generated from a candidate media stream 219.

Thus, taking fingerprint CFP1 from within the sequence as an example, then CFP1 is searched against all of the reference fingerprints stored in the store 210. The arrows between the reference fingerprints RFPn and candidate fingerprints CFPn represent fingerprints that are deemed to match according to the above criteria. Thus, in the example being given, it can be seen that CFP1 is found to be a match against RFP2; RFP4 and RFP5.

It is recalled that in the embodiment being described the media streams 204a and 219 are video streams and as such, it is likely that neighbouring frames within the video streams do not change significantly. This low amount of change between frames is particularly the case for periods in which there is low movement in the video stream. Similar effects are likely to be seen in streams of other types of data.

The similarity between frames can result in multiple matches of fingerprint within a stream. Also, media streams having a similar content may also result in matches in the fingerprints representative of those streams. In one example, a similar sequence of camera movements (eg panning and zooming and change of shot) within two different football matches (or other content) may generate similar sequences of fingerprints. There may be co-incidental matches with fingerprints in other streams.

It will also be appreciated that embodiments may not have temporal alignment between the fingerprints generated from the candidate and reference streams. Indeed, it is perhaps likely that the temporal relationship between a candidate media stream 219 against a reference stream 204a will not be known. Thus, looking at CFP3, it can be seen, in this example, that it has been matched against RFP1, RFP6 and RFPn. It will be noted that RFP1 is before any of the reference Fingerprints (RFPn) against which CFP1 has been matched thereby making it less clear how the candidate fingerprints (CFPn) are temporally aligned with the reference fingerprints (RFPn), assuming that the fingerprints represented in the FIGS. 11a and 11b do in fact represent the same media stream.

FIG. 11a is likely to be a simplification as to both the number of matches between the candidate fingerprints CFP1 and the reference fingerprints RFP1 and also the dispersed nature since, as discussed above they may well be matches to other media streams.

Some embodiments may be arranged to add a time stamp to each fingerprint that is generated. Further, such embodiments may be arranged to constrain the reference fingerprints against which the candidate fingerprints are compared to those that occurred within a predetermined time of the candidate fingerprint. Such embodiments may enable more rapid searching of the reference fingerprints and may also be useful when the media-component represents an Internet media stream of an event where copied streams are likely to occur within a short time period of the original media stream.

Thus, the identification processing mechanisms 216a-d will generate a set of matches between candidate fingerprints CFPn and reference fingerprints RFPn. In the embodiment being described which is monitoring a media stream each match corresponds to an individual four second segment of a reference media stream 204a-d matching a 4 second segment of the candidate media stream 219; it being recalled that a single reference or candidate fingerprint is generated from a 4 second length of a media stream and this is shown in FIG. 12.

FIG. 12 represents a media stream (whether a reference or candidate media stream) by a line and it can be seen that the streams is marked in second long intervals from 0 seconds through 10 seconds. Nine fingerprints are then shown below the media stream 204, 219 (FP1 through FP9). The first of these fingerprints FP1 extends from t=0 to t=4; the second FP2 from t=1 through t=5; the third FP3 from t=2 through t=6; etc. Thus, the first fingerprint FP1 is generated by a window position extending across the media-component (ie media stream) from t=0 to t=4; a second window position occurs between t=1 and t=5 and there is therefore the 1 second time difference between window positions discussed herein.

It can be seen that 5 Fingerprints are required to cover and 8 second interval. The overlapping nature of the fingerprints is believed advantageous to lessen the significance of a change in the media stream within anyone fingerprint FPn. Some embodiments of the system are required to have a region of 6 matching fingerprints (ie M=6 as described below) which corresponds to the 5 Fingerprints required to give 8 seconds of coverage but with an extra fingerprint which is believed to increase robustness.

In other embodiments, it has been found that the difference in time between window positions used to generate the fingerprints is advantageously 0.5 s. It will be appreciated that reducing the time difference between window positions increases the fidelity with which the behaviour of the fingerprint over time can be represented (whether candidate or reference). As such, and with reference to the embodiment being described, a smaller time difference allows the system to be responsive to faster changes within the media-streams 204, 219.

Thus, in the embodiment being described, the window generator is arranged such that portions of the media-component generated by neighbouring positions of the window overlap. Other embodiments may of course be arranged such that the window generator is arranged to generate neighbouring window positions that are non-overlapping.

In particular, it will be appreciated that in the embodiment being described, a DCT is used to generate the fingerprints (whether candidate or reference) which extracts frequency information from the media stream. It has been found that embodiments that use the lower frequencies are advantageous in generating robust matches in the comparison between the candidate and reference fingerprints. However, in order to capture those lower frequencies a longer time period (when compared to the higher frequencies) is required. It has been found that a time period of substantially 4 seconds provides sufficient low frequency information to give robust matches whilst using overlapping time windows allows a reasonably high sample rate. It will be appreciated that a higher sample rate increases the ability to generate accurate fingerprints for a rapidly changing video stream.

Also, as can be seen from FIG. 12, once the stream is established, any one second interval is covered by 4 fingerprints which corresponds to the four second length of the fingerprint. Thus, in other embodiments in which the length of the media stream covered by a fingerprint FP is other than four seconds then a different number of fingerprints would cover each time interval. The overlapping nature of the fingerprints is believed advantageous and allows the aggregation process described below in relation to FIG. 11b to skip fingerprints and still have confidence that a match between a candidate media stream has been found against a reference stream held within the store 210 since data for that period is still being matched.

It is conceivable that matches between candidate (CFPn) and reference (RFPn) fingerprints may be false positives. It is also conceivable that a 4 second segment of candidate media stream 219 that should have produced a match (ie matches a reference media stream) did not result in a match (ie a false negative). As discussed above, if the data relates to a media stream, such as a video, then it is likely that neighbouring frames of the media stream (eg 300a-d) are similar to one another and therefore, fingerprints, whether candidate or reference, which are generated from similar time regions of the media stream are likely to be similar to one another.

Accordingly, each of the identification processing mechanisms is further arranged to aggregate a number of matches as is now described with reference to both FIGS. 10 and 11b. As a starting point and as described in relation to FIG. 11a, the store 210 is searched to locate each reference fingerprint RFPn that matches a given candidate fingerprint CFPn. An aggregation process is then performed to provide a more robust identification of a candidate media stream 219 against a reference media stream 204a (or other media-component) for which candidate fingerprints RFPn are held within the store 210. As described above, a match between a single reference fingerprint RFPn and candidate fingerprints CFPn does not necessarily identify a match between a candidate media stream 219 and a reference media stream 204a, or between any other candidate media-component and reference media-component As described in relation to FIG. 11a it is likely that there are at least some false matches against any one candidate fingerprint CFPn that is being processed. Accordingly, embodiments that implement the aggregation process are believed advantageous since they increase the robustness of the identification of the candidate media stream 219 (or other media-component) within the reference media streams 204a (or other media-component) which have generated the reference fingerprints within the store 210. This increased robustness provided by the aggregation process may allow, in some embodiments, a less robust fingerprint to be taken of the media component which can allow a fingerprint to be taken more quickly.

Thus, the aggregation process identifies regions 1002 of the candidate fingerprints CFPn generated from the candidate media stream 219 which map to regions of fingerprints RFPn generated from the reference media stream 204a and use the temporal relationship to increase the belief that a match between a candidate fingerprint CFPn and a reference fingerprint RFPn exists.

Thus, looking at FIG. 11a it can be seen that matches exist between the following fingerprints within the sequence of fingerprints shown in the Figure:

CFP2 and RFP5;
CFP3 and RFP6;
CFP4 and RFP7; and
CFP6 and RFPn.

It should also be noted that in the example given that CFP5 was not found to match reference fingerprint RFP8.

FIG. 11b shows how the aggregation process determines that a match has occurred between the candidate media stream 219 and the reference media stream 204a.

The aggregation process looks for any region of candidate fingerprints CFPn within the sequence that has multiple matches and any such region that passes the aggregation process is reported as a positive match. In one embodiment this may mean that the candidate media stream 219 matches a reference media stream 204a-d being monitored by the system 200. In other embodiments this may mean that a candidate media-component has been identified against reference fingerprints representing a reference media-component which are held within the store 210. As described above a positive match is reported if a minimum number of candidate fingerprints in a sequence is held to match fingerprints with the sequence of reference fingerprints.

In the context of the preceding paragraph a region of fingerprints may comprise any number of consecutive fingerprints and may for example comprise substantially 2, 3, 4, 5, 6, 7, 8, 9, 10, 15, 20, 25, 30 or more consecutive fingerprints.

A sequence of candidate fingerprints is said to be an overall, aggregated, match of a sequence of reference fingerprints if, for the same number of reference and candidate fingerprints (ie the same time period)—step 1004:

1. The sequence is at least M fingerprints long, where M in the embodiment being described is set to 6;
2. The sequence starts with a positive candidate/reference fingerprint match;
3. There is no gap between positive candidate/reference matches longer than D, wherein the current embodiment D is set to 3. This test ensures that there are fewer than a predetermined number of gaps within the sequence of fingerprints. In the embodiment being described, this equates to it being permissible to have non-matches between candidate and reference fingerprints of up to 3 seconds whereas a period of 4 seconds would result in a failure to meet the aggregation test.

Putting this in to context with FIG. 11b, it is seen that CFP2 is the start of block 704 of matches (identified by the tick in CFP2) which maps to RFP5. The block 704 contains 9 candidate fingerprints (CFP2 to CFP10) which include 7 matches (CFP2; CFP3; CFP4; CFP6; CFP8; CFP9; and CFP10) and two misses (CFP5 and CFP7), ie gaps between neighbouring matches. Accordingly this block 704 meets the criteria that has been set and match between candidate media stream 219 and reference media stream 204a is deemed to have occurred since the points 1 to 3 above have been met. It will be noted that for reasons of clarity only some of the links between the candidate fingerprints (CFP10) and the reference fingerprints FRPn are shown.

Thus, in the embodiment being described, the block 704 meets the criteria and a match between that block of candidate media stream 219 and reference media stream 204a is deemed to have occurred; step 1006.

Thus, in summary of the above the comparator can use several characteristics to assess whether the sequence of reference fingerprints matches the sequence of candidate fingerprints. In the embodiment that has been described, this characteristics can include characteristics on the matches between individual fingerprints as well as characteristics on the comparison of the sequence of fingerprints (for example the four second sequences).

Characteristics on the matches between individual fingerprints may include at least one of the following:

a comparison of Hamming distance between the 2 fingerprints.
a comparison of candidate fingerprint quality against a quality threshold.
a comparison of reference fingerprint quality against a quality threshold.

Thus, if any of these are not met the candidate fingerprint is held not to be a match of the reference fingerprint.

Characteristics on the matches between sequences of fingerprints may include at least one of the following:

whether a threshold number of aggregated fingerprints are matched across the sequence.
whether a largest 'gap' threshold of non-matching fingerprints is exceeded within the sequence.
whether a mean Hamming distance threshold is met across the sequence.
whether a difference in quality between candidate fingerprints and reference fingerprints is met across the sequence.

Thus, if any of these sequence level thresholds are not met, the embodiment will determine that the candidate sequence is not a match to the reference sequence.

In order to try and prevent the system from being circumvented by simply manipulations of the candidate media stream the media stream is mirrored both horizontally and vertically and each orientation is passed through the fingerprinting process. Thus, in the embodiment being described each candidate media stream passes through the fingerprinting process 4 times: un-mirrored; vertically mirrored; horizontally mirrored; and both horizontally and vertically mirrored.

In other embodiments the candidate media-components may undergo other processing in order to try and prevent the defeat of the system.

The identification processing mechanisms 216a-d are then arranged to report each region that passes the aggregation process as a positive match between a region of candidate media stream and reference media stream.

In one embodiment, the system described in relation to the above Figures may be used in the process as described in relation to FIG. 13 which is now described.

As a first step 1, Reference Fingerprints RFPn are generated and stored in the store 210 as described above. Also, as described above, the system may be arranged to monitor many types of data but is, in the embodiment being described, directed toward monitoring various types of media component: particularly any one or more of the following: video files; streamed video; audio file; streamed audio files.

Embodiments that monitor media-components other than video or audio files will typically use a fingerprint algorithm other than one based upon a DCT described herein.

In step 2 a user plays an initial version of a media component, such as by playing the media component on a web page or the like. If this initial version of the media component has been processed by the system and has a reference fingerprint RFPn stored in the store 210 it can be identified by the system. In FIG. 13, step 2 is shown as originating from the same origin as step 1 implying that the initial media component, played by the user, originates from the same source as the media component from which the reference fingerprint RFPn is generated. However, this need not be the case and, in other embodiments, the initial media component may be obtained and played, by a user, from any source.

In step 3, the initial media component that is being played by a user is treated as a candidate media component and therefore has candidate fingerprints CFPn generated for it as described above. It will be appreciated that candidate fingerprints CFPn can be generated for the media component regardless of the origin of the media component. The method is then arranged to ascertain, as described above and in particular with reference to FIGS. 11a and 11b, whether the so generated candidate fingerprints CFPn corresponds to any of the reference fingerprints RFPn stored in the store 210; ie a look-up of the candidate fingerprint is performed against the sore of reference fingerprints 210. The skilled person will appreciate that if sequence of candidate fingerprint CFPns is identified as corresponding to a sequence of reference fingerprints RFPn then it is assumed that the candidate media component is the same as the reference media component (ie the file that generated the reference fingerprint) and thus, the candidate media component has therefore been identified.

In a fourth step of the method shown in FIG. 13 the processing circuitry that a user is using to play the initial media component is arranged to connect to a source from which an improved version of the initial media file can be obtained. It will be appreciated that such a method may be made to work with a variety of processing device and for example a user may be able to view the initial media file on any of the following: a Personal Computer (such as a PC running Windows or LINUX or other OS; a MAC; a mobile phone (such as an iPhone, an Android device, a Windows mobile, a Blackberry or the like); a Smart television; a tablet (such as an iPad, a Kindle, an Android, or the like), etc.

The source of the initial media component may then be arranged to supply a version of the initial media component to the processing device being used by the user. The version of the initial media component may have added value when compared to the version initially played by the user.

The added value may comprise any of the following: higher quality; improved sound; a commentary; sub-titles; different camera angles; further audio tracks; hidden scenes or the like.

The system may be arranged to debit an account, or otherwise charge, the user for the supply of the improved media component; eg the media component with the added value.

Further, it is convenient to describe the system in relation to the monitoring of video streams as the mechanism to deliver media content to a user. However, in other embodiments, the techniques described may be equally applied to other forms of media component. For example, video files such as MP4 files and the like may be thought of as being media components. In yet further alternative, or additional, embodiments media components may be provided by audio content such as streamed audio content, or discrete audio files (such as MP3 files, the audio track of a video or the like). The skilled person will appreciate how to modify the watermarking and fingerprinting algorithms to process audio rather than video data. Thus, reference to stream in the text below should not be taken as limited the streaming of media and is also intended to refer to non-streamed delivery mechanisms.

Reference is made throughout the following description to FIG. 16 which illustrates the overall process that is employed, by embodiments, to monitor and/or protect media components.

The system 1400 shown in FIG. 14, which may be thought of as a media delivery platform, allows a reference media stream 204 (ie media component) to be fingerprinted so that it can be identified as described hereinafter. More detail of how a Fingerprint is taken is provided in the preceding Figures.

Further, the system 1400 allows the reference media stream 204 to delivered to a plurality of users such that the version delivered to each of the user has a unique watermark embedded therein. This unique watermark allows the user to which a given version of the reference media stream was delivered to be identified as described below.

Yet further, the system 1400 allows a network, which in the embodiment being described is the Internet and/or the World Wide Web 1402, to be monitored for copies, or other illicit versions (hereinafter referred to as 'copies'), of the reference media stream 204. The network may or may not be the same as the network 251 described above.

Should copies be detected then the system is arranged to determine, using the unique watermark, the user to which that version of the reference media stream was delivered. The monitoring system is also described in more detail in relation to the preceding Figures.

Thus, referring to FIG. 14, it can be seen the reference media stream 204 is passed through a fingerprinting process 1600 provided on an reference fingerprint generator 202 which generates a reference fingerprint RFP useable to determine if a candidate media stream matches a reference media stream 204 monitored by the system. The fingerprints generated by the generator 202 are maintained within a store 210. The components of the fingerprinting system are described in more detail in FIG. 2 and elements of FIG. 14 described in more detail in FIG. 2 are shown within the chain-line 1403 and like parts are referred to with like reference numerals.

The fingerprinted media stream 1406 passes through a watermarking process 1407 which generates at least two version of the fingerprinted stream 1406: a first watermarked version 1408; and a second watermarked version 1410. Whilst, in the embodiment being described, there are only two watermarked version of the reference media stream other embodiments may provide more than two versions.

As described hereinafter, a watermark is applied to each frame of the watermarked version 1408, 1410 and the same watermark is applied to each frame within the same version of the watermarked media stream. The watermarked versions are then stored within a delivery system 1412.

In the embodiment being described, a different watermark is applied to the frames of each of the first watermarked version 1408 and the second watermarked version 1410. At least some embodiments, including the one being described, use an orthogonal watermark so that the watermark applied to the first watermarked stream is as distinguishable as possible from the second watermarked stream. In one example a sequence such as 1, 2, −1, 3, −2 . . . may be used to generate the watermark for the first stream. In the embodiment being described the orthogonal sequence −1, −2, 1, −3, 2 . . . is then used to generate the second watermark.

In other embodiments, it is possible that only the second watermarked stream 1410 has a watermark applied to the frames thereof and the first watermarked stream 1406 remains a copy of the fingerprinted media stream 1406 without any watermarks being applied thereto. Embodiments that apply watermarks to only some of the media streams may be advantageous in view of the reduced processing required.

To embed each watermark, each frame of both the first 1408 and second 1410 watermarked versions is processed. Each frame is transformed into block-DCT (Discrete Cosine Transform) space, such that a DCT is applied to each N×N pixel block in the input frame, where N is 8 in the embodiment described. In other embodiments, N may be any other value but it is believed that N=8 gives a relatively robust watermark without presenting too great a burden on the processor.

A pseudo-random sequence of watermark coefficients is generated, and the DCT coefficients in each DCT block are modified by this pseudo-random sequence. The amount that each component is changed is weighted by the DCT strength, to reduce visual artefacts that might otherwise be apparent to a viewer of the frame. An inverse DCT is then applied to each block to recover the watermarked version of the original image. Each input (unwatermarked) frame will be processed to generate one or more output (watermarked) frames, one per watermark symbol, where each watermark symbol has a different pseudo-random sequence of coefficients. Here it will be appreciated that, in the described embodiment, a different watermark symbol is applied to each of the first 1408 and second 1410 watermarked versions but that the same symbol is applied to each frame of those versions.

It is conceivable that in some embodiments, some frames within the media might not be watermarked so that every other, every nth frame, or the like is watermarked. However, it is believed that such embodiments are less robust and would take longer to recover the watermark from any candidate media stream since only every Nth frame is being processed thereby providing less information from which to recover the watermark.

DCT-based Watermark Recovering without Resorting to the Uncorrupted Original Image; by A. Piva, M. Barni, F. Bartolini, V. Cappellini; Dipartimento di Ingegneria Elettronica; Universit'a di Firenze via S. Marta 3, 50139, Firenze, Italy describes similar techniques for embedding watermarks and the skilled person is directed to read this paper to understand how to embed a water mark such that it can be recovered without reference to the original image.

A Survey of Digital Image Watermarking Techniques", Vidyasagar M. Potdar, Song Han, Elizabeth Chang may also be useful to the skilled person.

The watermarked frame is further processed to reduce visual artefacts associated with the watermark. A spatial mask is calculated, where the value of the mask represents the tolerance of the HVS (Human Visual System) to small changes in the value of each pixel in the frame. For example, the value of the mask at each pixel can be set to the variance of the 8 immediately surrounding pixels. The masked watermarked frame is given by the sum of the original frame and the watermarked frame, weighted by the HVS mask, so that the watermark is heavily embedded in regions of the version where the HVS is least sensitive to perturbations. The same mask is applied to each watermarked frame, to produce a plurality of masked watermarked frames (two in the current embodiment).

In the embodiment being described, the watermarking process 1407 additionally generates metadata which contains descriptors of key features within the frames of the watermarked media stream, which features are used to temporally and spatially align candidate media streams in order to recover any watermark therein. In order to reduce computational complexity and storage requirements features are not extracted for every frame and in this embodiment, features are extracted for every 10th frame. Other embodiments may store features for more frames (ie for frames less than every 10 frames), or for fewer frames, (ie for frames more than every 10 frames). The features extracted in the current embodiment are in the form of ORB feature descriptors (Oriented FAST and Rotated BRIEF), which allow a rescaled and/or rotated candidate media stream to be reconstituted to the original dimensions during watermark extraction.

It is convenient to describe the delivery system 1412 as an adaptive streaming protocol (such as HTTP Live Streaming (HLS); 3GPP adaptive HTTP streaming; Microsoft™ Smooth Streaming; Dynamic Adaptive Streaming Over HTTP (DASH)) but systems other than adaptive streaming protocols may be used in other embodiments. Some embodiments of the system may be arranged to process media-streams that do not correspond to a known format. Some embodiments of the system may be able to re-combine audio and video files from separate streams/files. Such functionality typically arises from the processing of the header information of the various layers of the network traffic as described below.

In an adaptive streaming protocol, each version 1408, 1410 of the watermarked reference media is encoded such that multiple versions are maintained with each version being suitable for differing bit rates, differing frames sizes, etc. However, the watermarking is such that it will survive the encoding of the watermarked streams 1408, 1410. The figure shows a repository 1414, 1416 respectively for each of the first and second watermarked versions. The skilled person will appreciate that whilst it is convenient to show separate repositories it is not necessary to provide separate repositories. Thus, in other embodiments there may be more or fewer repositories.

The skilled person will appreciate that for an adaptive streaming protocol the media stream is delivered, not as a continuous stream, but as a series of time-bounded segments (eg blocks) generated from the original media stream. Therefore, the multiple versions of the media streams held within the repositories 1414, 1416 each comprise a series of time-bounded segments. In the embodiment being described, each of the time-bounded segments is typically of 5 to 10 seconds in duration. All of the frames within a given time bounded segment will have the same watermark applied thereto. However, it is conceivable that at least some embodiments will use a length for each time bounded segment of less than 5 seconds which is the minimum time bounded segment time suggested for some adaptive streaming protocols to ensure that there is not too much network traffic.

Embodiments that do not use adaptive streaming protocols, in particular but not exclusively, may use time bounded segments of less than 5 seconds and for example may use time bounded segments of in the range 0.1 seconds to 15 seconds. The skilled person will appreciate that the shorter the time bounded segment, the quicker a watermark can be extracted from media content/media stream.

Each time-bounded segment will have a start-time and an end-time relative to the original, ie reference, media stream. For example, in an embodiment in which each time-bounded segment is 5 seconds in duration, the third time-bounded segment will commence at 10 seconds into the stream and finish at 15 seconds into the stream. The start-time and the end-time may both be thought of as being timing information.

The system 1400 is arranged to store the timing information in relation to each of the media streams held in the repositories 1414, 1416. In some embodiments the timing information is held within the store 210 but this need not be the case.

A delivery process 1418 is arranged to service the request for a media stream from a client device. Three such client devices are shown in the Figure: a mobile telephone 1420 (such as an iPhone™; an Android Device™; a Windows™ mobile; or a Blackberry™); a computer 1422 (such as a PC running Windows™, LINUX or the like; an Apple computer; or the like) and a tablet 1424 (such as an iPad™; a Kindle™; an Android Tablet™ or the like). The skilled person will appreciate that other devices such as televisions; watches; or the like may also form client devices. As described below, the delivery process 1418 is arranged to generate a unique version of the media stream for each of the client devices 1420, 1422, 1424 which unique version is arranged to identify the client device to which that media stream was delivered. Therefore, each client device 1420, 1422, 1424 may be thought of as being a target device to which media content can be delivered.

Specifically, a user 1420-1424 requests a media stream (ie media component) from the system 1400. As per adaptive streaming protocols (such as HLS) the client is, following the request for the media stream, served with a text list of URLs (Uniform Resource Locators) which are generated by the system 1602. These URL's are to the time-bounded video segments that make up a version of the requested media stream. As discussed above, the repositories 1414, 1416 each contain multiple copies of the media stream in order that different channel conditions, target devices, etc. can be served the media stream.

It will be appreciated that in other embodiments, a user may request media component other than a media stream. For example, a user could download a file providing media content (eg a video file or an audio file).

Additionally, the system 1400 determines the identity of the user 1420-1424 that made the request for the media stream. For example, the user is likely to have an account with the provider of the media stream to which they are making the request and the identity of the user may be obtained from the account details of that user 1420-1424. In other embodiments the user 1420-1424 may need to input an identifier, etc. as they request the media stream.

The delivery system 1412 is then arranged to generate a playlist for that user 1420-1424 for that request. Typically, this playlist will be unique to that particular request for the media stream. The URL's making up the playlist point to time bounded segments in each of the repositories 1414, 1416 within the delivery system 1412 such that a set of time-bounded segments which when stitched together by the protocol generate the media stream. As such, when the browser or other software used by the user 1420-1424 accesses the URL list it is served time-bounded segments that are generated from each of the first 1408 and second 1410 watermarked versions of the media stream. Because the URL list has been generated by the system specifically for each of the users 1420-1424 each user receives, in the embodiment being described, a unique combination of time-bounded segments to form the delivered media stream that is delivered to him/her. Such delivered media streams are exemplified by the lines 1419a, 1419b, 1419c in FIG. 14.

In the embodiment being described, the delivery system 1412 uses a 32-bit binary number to generate the sequence of URL's. In the embodiment being described, the choice of watermark symbol within the time bounded segments of the media stream sent to a user 1420-1424 may be thought of as providing a zero or a one of a binary number. Here it will be appreciated that each of the first 1408 and second 1410 watermarked streams have a different symbol applied to them. For example, the presence of a time-bounded segment from the first watermarked version 1408 gives a zero and the presence of a time-bounded segment from the second watermarked version 1410 gives a one. Therefore, in the embodiment being described, 32 time-bounded segments are required to identify the user 1420-1424 to whom the media stream was streamed. Thus, the order in which the time bounded segments are served provides an identity code which has been assigned to a given user.

Thus, in the embodiment being described, 32 time bounded segments are needed to provide the identity code which has been embedded into the delivered media stream 1419. Thus, assuming that a time bounded segment is 5 seconds in length, then 2 minutes and 40 seconds of media stream are needed to recover the identity code. Thus, the length of the time bounded segments and number of bits which encode the identity code are a balance between providing a robust identification, allowing a large population of users to be indexed and allowing the identity code to be recovered quickly from a media stream.

The skilled person will appreciate that other embodiments may utilise a different number of bits. Moreover, other embodiments may use number bases other than base 2 for the generation of the code and such embodiments would comprise more than two versions of the watermarked media streams: to generate a base 3 number would require 3 version of the watermarked media stream, etc.

As the media is delivered to the client devices 1420-1424 a monitoring system 218 monitors 1604 the network 1402/251 for media having a fingerprint that is stored within the store 210. Should the monitoring system 218 detect, on the network, Copies of a reference media stream 204 having a recognised finger print (ie a fingerprint stored in the store 210), then a controller 1426 is arranged to identify, using any watermark within the copy media stream, the user 1420-1424 to which the media was sent. The controller 1426 is then arranged, in some embodiments, to stop the delivery of the delivered media stream to that user 1420-1424 by controlling 1428 the delivery process 1418.

Although only one fingerprint generator 202 is shown in FIG. 1, the fingerprinting system 200 will typically several reference fingerprint generators 202a, 202b, 202c, 202d. FIG. 2 shows four fingerprint generators 202a-d but this is merely indicative and other embodiments may contain any number.

Referring to the systems described above, then the candidate media streams provide candidate media content to be decoded from which an attempt to extract a watermark is made as described hereinafter.

The fingerprint detection process 1606 as described in relation to the above figure identifies candidate media-streams that are felt to match reference media-streams. Such identified candidate media-streams may be thought of as matched media streams. The following process is performed on matched media-streams in order to determine whether that stream carries a watermark. Here it will be appreciated that the monitoring system described above can be used to monitor both watermarked and non-watermarked media-streams.

The output of the above process provides what may be thought of as coarse temporal synchronisation between the reference media stream and the candidate media stream. Here temporal synchronisation may be thought of as identifying how remote a portion of the candidate media stream is from the beginning of the, original, reference media stream. The portion reference here might be a frame of a video stream or other portion. Such temporal alignment is useful in embodiments which are detecting watermarking as it will be appreciated that different watermarks are applied to 5 second time-bounded segments of the media-stream. Thus, to identify the identity code provided by the watermark sequence the system identifies at least the start and end points of the time bounded segments within the matched media streams.

The alignment of the matched media-stream 1500 against a reference media-stream 204 is shown in FIGS. 15a and 15b. FIG. 15a shows a matched media-stream 1500 which is temporally aligned with the reference media stream 204 and it can be seen that the time bounded segments, each represented by a block, such as 1502a, 1502b, 1504a, 1504b. As in FIG. 141, the shading of each block shows the watermark that has been applied to that block. It will be appreciated that the candidate media-stream 1500 may not be split into time-bounded segments of the original, reference, media-stream 204 which time-bounded segments are likely to have been removed during any copying, modification, etc. of one of the delivered media-stream 1419. However, the watermarked regions will likely retain the timing of the watermarked media-stream and thus, in the embodiment being described, appear in 5 second blocks within a candidate media-stream 1500.

FIG. 15b shows a matched media-stream 1506 which is not temporally aligned with its associated reference media-stream 204. As discussed above, temporal alignment means that the system has not identified portions of the matched media-stream relative a point, typically the beginning, of the reference media stream 204. As such, it can be seen that segment 1502b is not aligned with block 1502a and block 1504a is not aligned with block 1504b. Thus, in the example of FIG. 15b, should the watermarks be compared the comparison would likely fail since the system has incorrectly identify the time-bounded segments relative to the start of the reference media stream 204.

In the case of a video media-stream, the output of the above fingerprinting process will also identify whether the matched media stream has been flipped horizontally and/or vertically. Embodiments may process the matched media stream to reverse any such detected flipping before detecting the watermark within the matched media-stream.

It is conceivable that the temporal alignment of the matched media stream from the fingerprinting process is not sufficient. As such, at least some embodiments, including the one being described perform further alignment. In particular, it will be appreciated that the rate of change in some media streams may be quite low and such media-streams, especially, may need a more precise alignment. It will be appreciated the more precise the start and end points of the time bounded segments within a matched media stream can be aligned with the reference media-stream then the more likely it is the watermarking extraction process described below will give the correct outcome.

The embodiment being described extracts feature descriptors from the matched media-stream of the same format at the original reference media-stream 204 (ORB feature descriptors). A video registration is then performed between the extracted features from the matched media-stream and the reference media-stream 204 to which a match has been found. The video registration identifies finer time synchronisation between the matched media stream 1500 and the reference media stream as well as any geometric transformation (eg rotation; scaling; and/or translation) between the matched media-stream 1500 and the reference media stream 204. The matched media-stream 1500 is transformed to reverse any such transformation, so that it has the same geometry as the original reference media stream 204.

Next, the process identifies frames within each of the time bounded segments (eg 1502b, 1504b) and process each of those frames to extract any watermarks that are within each frame.

In the embodiment being described there are two possible watermarks which could have been applied to any given frame. In other embodiments it is possible that a different number of watermark symbols, or simply the presence or absence of a watermark may be applied. As such, the process assigns a belief against each of the possible watermarks and determines that the frame being processed contains the watermark in which the highest belief is assigned.

To extract the watermark, the frame is transformed into block-DCT space as described in the watermark embedding process. The score of each DCT block is given by the summed correlation between the DCT components and the random sequences corresponding to each candidate watermark code (as described previously). The overall scores for the frame are given by the sum of the scores for individual DCT blocks.

A watermark value is then assigned to each of the time bounded segments. In the embodiment being described this determination comprises determining which of the two watermark symbols has the higher score in each time bounded segment. This determination is made on a simple scoring basis: the watermark symbol with the highest score summed over the frames making up the time bounded segment is taken to represent the watermark value in that segment.

Next, the identity code that has been encoded into the delivered media stream, from which the matched stream has been derived, is determined 1608. It will be appreciated from above the identity code is encoded into, in this embodiment, 32 consecutive time bounded segments. As such, the embodiment collates the watermarks from 32 consecutive time bounded segments. The timing information that the system has stored in used to help ensure that start and end points of the sequence of time bounded segments is correctly identified. The output of this process is the generation of a 32 bit number provided by the watermark that has been applied to the time bounded segments of the matched media stream. In other embodiments, any other length of number is equally possible.

Finally, the 32 bit number is compared to valid identity codes that have been assigned to users 1420-1424. If the 32 bit number corresponds to a valid code then the extraction of the identity code has been successful, whereas if this is not the case the extraction of the identity code has failed.

Some embodiments, may be arranged to continuously extract identity codes from a candidate media-stream, or at least make multiple extractions of the identity code from a candidate media stream, and subsequently to average or otherwise combine the identity codes. Such embodiments can help to increase the belief in the identity code that is extracted from the matched media stream.

Once a valid identity code has been extracted from a matched media stream then identity of the user to which the delivered media stream 1419a-c was sent is determined, typically by accessing a database of users which contains the identity code assigned to each of them. Embodiments of the system may then take appropriate action, including but not limited to automatically terminating the delivered media stream to the identified user (eg user 1420).

The process of determining the identity of a user (eg user 1420) from a matched media stream is performed in real time such that it is possible to terminate the media-stream whilst the delivered media stream is being streamed. In the embodiment being described, it will be appreciated that the fingerprinting identification process performed on the candidate media stream 219 takes on the order of 1 minute. Further, the watermark extraction process will take on the order of 5 minutes (32 bits, with 10 seconds per bit). Thus, here, in real-time, may mean on the order of 5 to 10 minutes. For example, in real time may mean substantially 8 minutes.

As described above, a 32 bit number is encoded into the delivered streams via the first and second watermarks to provide a, typically, unique identity code into each of the delivered streams. In some embodiments, at least some of the bits of the embedded code are used to provide header and/or check bits. As such, the identity code might not be a 32 bit number. The skilled person will appreciate that the number of bits used to encode information into the delivered media streams 1419*a-c* may be varied between embodiments.

In some embodiments the check bits may provide an error correcting code. For example, the check bits may allow any one of the following codes: a Hamming Code; a Reed-Solomon code; a Low Density Parity Check; or the like. The skilled person will appreciate use of such codes will increase the robustness, for embodiments that use the code, with which the identity code can be extracted from the matched media stream.

In some embodiments, the reference fingerprint generator may be termed a monitoring appliance.

In some embodiments, the identification processing mechanisms 216*a-d* may be thought of as being a node.

In the above, the or each media-component may be thought of as being a data-set.

As the skilled person will appreciate the connections 208*a-d*, 212, 214*a-d*, or any other of the network connections referred to herein may be any form of wired or wireless network connection. Typically such connections will use on TCP/IP protocols but this need not be the case.

The invention claimed is:

1. A computer implemented method of deriving a sequence of fingerprints from one or more media-components, the method comprising;
a) receiving the one or more media-component at a processing device and causing that processing device to:
i) move a window through the one or more media-component to a plurality of positions;
ii) select a portion of the one or more media-component;
iii) process the portion of the one or more media-component to generate a fingerprint indicative of the portion of the one or more media-component;
iv) cause the fingerprint to be stored;
v) process the portion to generate a quality measure indicative of the uniqueness of the fingerprint, wherein the quality measure is determined according to a change in a property between neighboring frames of the one or more media component; and
vi) cause the quality measure to be stored in association with the fingerprint.

2. The method of claim 1 in which the quality measure is generated for each of the positions of the window.

3. The method of claim 1 in which the media-component is a video and the portion of the media-component selected by each position of the window covers a plurality of frames of the video and the quality measure is determined from the change in the property between at least some of the frames selected by a position of the window.

4. The method of claim 3 in which the property is the change in intensity between neighbouring frames to generate an inter-frame intensity change.

5. The method of claim 4 in which the inter-frame intensity change is ordered according to magnitude.

6. The method of claim 4 which takes a predetermined percentile of the ordered inter-frame intensity changes as the quality measure.

7. The method of claim 1 which generates the fingerprint on the portion of the media-component using a three dimensional cosine transformation (3D DCT).

8. The method of claim 7 wherein the fingerprint comprises a sub-set of the co-efficients of the 3D DCT.

9. The method of claim 1 which down samples the media component before the fingerprint is generated.

10. A computer system arranged to generate a sequence of fingerprints from a media-component, the system comprising:
a processing device arranged to receive the one or more media-component and the processing device further comprising:
a window generator arranged to select a portion of the one or more media-component;
a fingerprint generator arranged to select a first portion of the one or more media-component selected by the window generator and to generate a first fingerprint indicative of the first portion of the media-component and to cause that fingerprint to be stored; and
a quality assessor arranged to process the first portion of the media-component to generate a quality measure indicative of the uniqueness of the first fingerprint and to cause the quality measure to be stored in association with the first fingerprint, wherein the quality measure is determined according to a change in a property between neighboring frames of the one or more media component.

11. The system of claim 10 in which the window generator is arranged to select a plurality of portions of the one or more media-component, the fingerprint generator is arranged to generate a fingerprint for each of the portions and the quality assessor is generate a quality measure for each of the positions of the window.

12. The system of claim 10 in which the media-component is a video and the portion of the media-component selected by the fingerprint generator covers a plurality of frames of the video and the quality measure is determined from the change in the property between at least some of the frames selected in the portion of the media component so selected.

13. The system of claim 12 in which the property is the change in intensity between neighbouring frames to generate an inter-frame intensity change.

14. The system of claim 13 in which the inter-frame intensity change is ordered according to magnitude.

15. The system of claim 13 which takes a predetermined percentile of the ordered inter-frame intensity changes as the quality measure.

16. A non-transitory computer-readable medium storing executable computer program code for deriving a sequence of fingerprints from one or more media-components, the program code executable steps comprising;
  a) receiving the one or more media-component at a processing device and causing that processing device to:
    i) move a window through the one or more media-component to a plurality of positions;
    ii) select a portion of the one or more media-component;
    iii) process the portion of the one or more media-component to generate a fingerprint indicative of the portion of the one or more media-component;
    iv) cause the fingerprint to be stored;
    v) process the portion to generate a quality measure indicative of the uniqueness of the fingerprint, wherein the quality measure is determined according to a change in a property between neighboring frames of the one or more media component; and
    vi) cause the quality measure to be stored in association with the fingerprint.

* * * * *